United States Patent
Baccelli et al.

(10) Patent No.: US 7,317,922 B2
(45) Date of Patent: Jan. 8, 2008

(54) DEVICE AND METHOD FOR CONTROLLING ADMISSION AND CONGESTION OF THE CONFIGURATION OF A WIRELESS COMMUNICATION NETWORK

(75) Inventors: Francois Baccelli, Meudon (FR); Bartlomiej Blaszczyszyn, Montrouge (FR); Florent Tournois, Tours (FR)

(73) Assignee: Inria Institut National de Recherche en Informatique et en Automatique, Rocquencourt (FR)

( * ) Notice: Subject to any disclaimer, the term of this patent is extended or adjusted under 35 U.S.C. 154(b) by 648 days.

(21) Appl. No.: 10/414,486

(22) Filed: Apr. 16, 2003

(65) Prior Publication Data

US 2004/0162082 A1    Aug. 19, 2004

(30) Foreign Application Priority Data

Feb. 19, 2003    (FR)   ................................... 03 02017

(51) Int. Cl.
*H04Q 7/20*     (2006.01)

(52) U.S. Cl. ...................... 455/453; 455/450; 455/509

(58) Field of Classification Search ................ 455/453, 455/450, 509
See application file for complete search history.

(56) References Cited

U.S. PATENT DOCUMENTS

| | | | |
|---|---|---|---|
| 5,241,686 A * | 8/1993 | Charbonnier | 455/453 |
| 6,438,374 B1 * | 8/2002 | Bhat | 455/423 |
| 6,618,597 B1 * | 9/2003 | Choi | 455/522 |
| 6,721,568 B1 * | 4/2004 | Gustavsson et al. | 455/450 |

* cited by examiner

*Primary Examiner*—Quynh H. Nguyen
(74) *Attorney, Agent, or Firm*—Foley & Lardner LLP

(57) ABSTRACT

The invention relates to a device and a procedure for aiding the management of a wireless telephony network consisting of stations. The procedure comprises, for a given mobile pertaining to a station:

Figure 2:
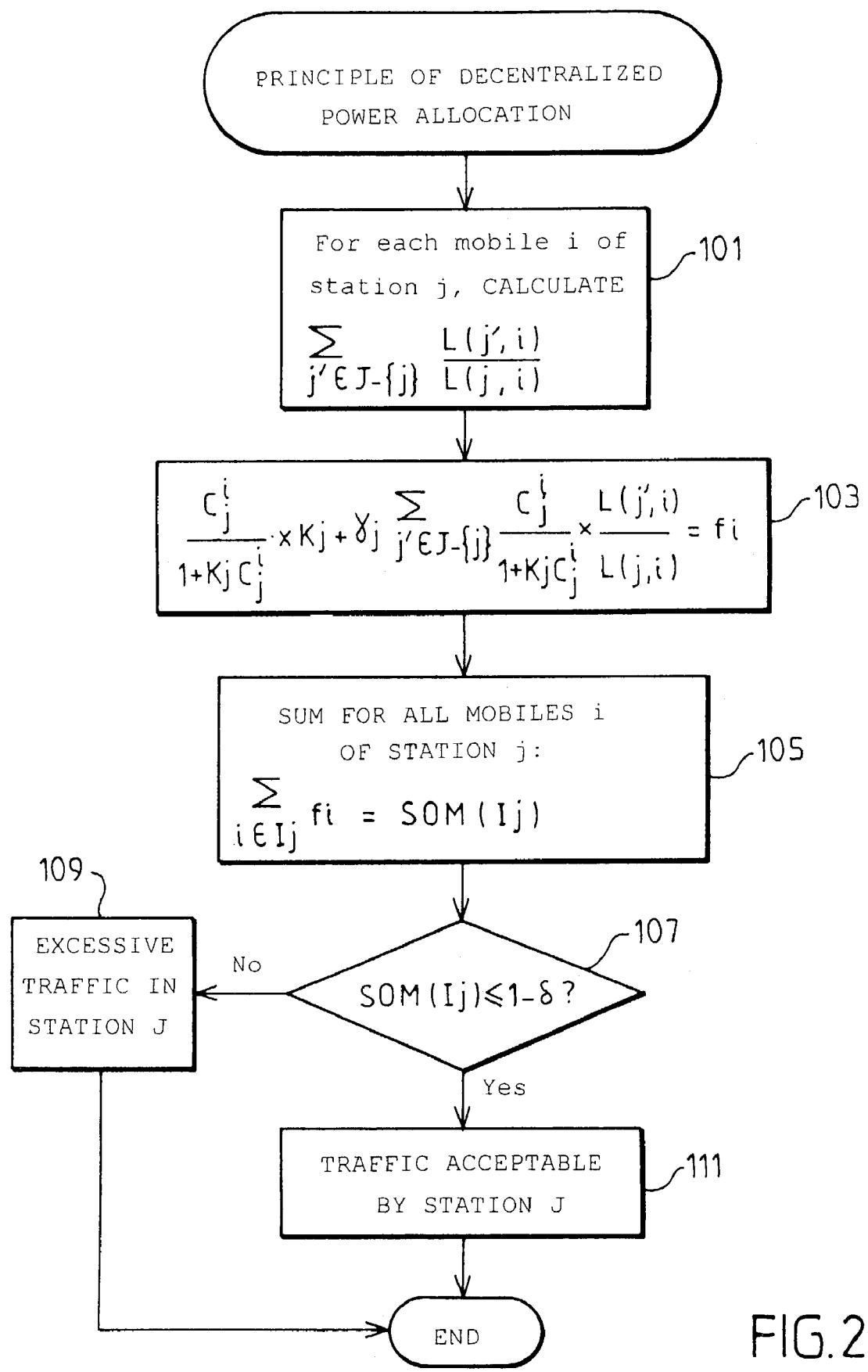

a—the calculation of a quantity incorporating the attenuation with regard to its station and the attenuation with regard to the neighboring stations (103), b—the product of this quantity times another quantity representing the requirements of the mobile with regard to its station (103), c—the summation of these products for a given set of mobiles pertaining to said station (105), d—the comparison of the sum with a threshold (107).

44 Claims, 10 Drawing Sheets

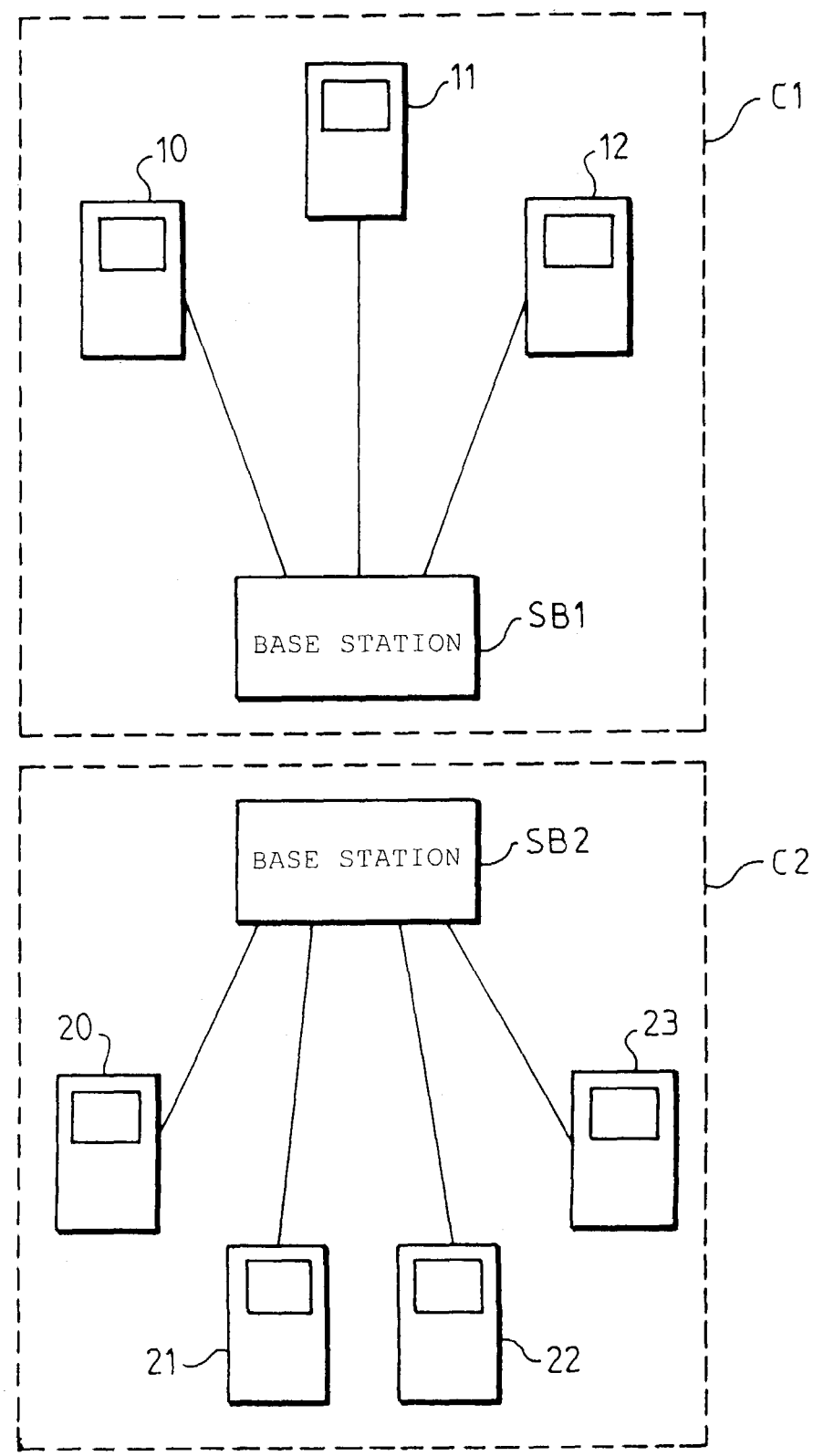
FIG. 1-A

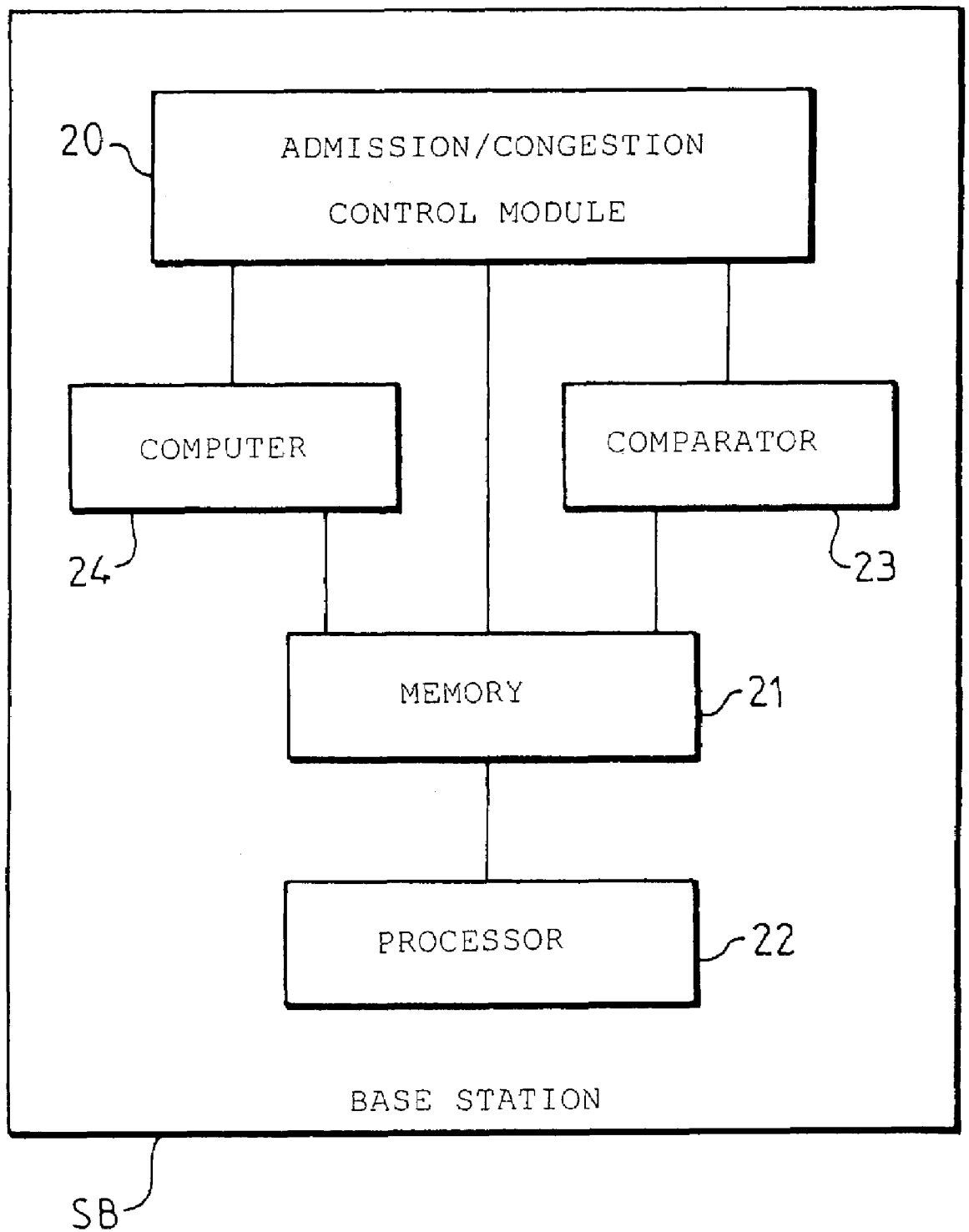
FIG.1-B

DEVICE AND METHOD FOR CONTROLLING ADMISSION AND CONGESTION OF THE CONFIGURATION OF A WIRELESS COMMUNICATION NETWORK

The invention relates to the field of wireless communications networks.

These wireless communications networks comprise base stations linked with mobiles. A base station is adapted, on request from a mobile, to establish a communication with this mobile. This communication allows an exchange of speech or of digital data between users. The expression "downlink" is used when the base station establishes a communication toward the mobile. One of the key points of the proper operation of the wireless communication network relates to the management of accesses (also called admissions) of a mobile to a base station, the mobile necessitating a certain power of the signal transmitted by the base station in order to be able to receive this signal (of user voice type). Moreover, it is difficult to reliably forecast a wireless communication network which complies with certain characteristics such as:

a communication established between a base station of the network and each requesting mobile, a guaranteed quality of communication for each mobile.

In the case of data transmission (of file type for example) by mobiles of a station, the bit rate demand of the mobiles at a given instant is variable. It is not obvious to adapt the bit rate in such a way as to avoid states of congestion of a station and more generally of the wireless communication network.

The invention aims to improve the situation.

The invention relates to a procedure for aiding the management of a wireless telephony network consisting of stations, comprising, for a given mobile pertaining to a station:

a—the calculation of a quantity incorporating the attenuation with regard to its station and the attenuation with regard to the neighboring stations, b—the product of this quantity times another quantity representing the requirements of the mobile with regard to its station, c—the summation of these products for a given set of mobiles pertaining to said station, d—the comparison of the sum with a threshold.

More particularly, step a—comprises the summation of two terms: the first term is the orthogonality factor between the channels of the station. The second term is the product of the orthogonality factor between the channels of the station and the channels of the neighboring stations and of the sum of the ratios of signal attenuation factors between the station and the neighboring stations.

The detection of a state of overload of the station as a function of the result of the comparison of step d—allows improved management of the telephony network.

In a first embodiment of the invention, when an overload state is detected in step d—and for a set of mobiles with fixed bit rate demand, the given set of mobiles pertaining to said station is reduced and the process is recommenced.

In a second embodiment of the invention, for a nonoverload state detected in step d—for a set of mobiles with fixed bit rate demand, and in order to control the admission of a new mobile with fixed bit rate demand to the station, steps a—to d—are repeated for the new mobile and when an overload state is detected in step d—, the mobile is barred from accessing the station.

In a third embodiment of the invention, for a set of mobiles transmitting data and thus having a variable bit rate demand, the bit rate allocated to each mobile is calculated in such a way that, during the comparison of step d, the sum is less than or equal to the threshold.

Thus, for a set of mobiles having a variable bit rate demand, the quantity representing the requirements of the mobile with regard to the station of step b—is evaluated so as to be roughly equal for each mobile of the station and so that the comparison of step d—does not detect any state of overload of the station.

The invention also relates to a device for aiding the management of a wireless telephony network consisting of stations, comprising a module capable of performing for a given mobile pertaining to a station:

the calculation of a quantity incorporating the attenuation with regard to its station and the attenuation with regard to the neighboring stations, the product of this quantity times another quantity representing the requirements of the mobile with regard to its station, the summation of these products for a given set of mobiles pertaining to said station, the comparison of the sum with a threshold.

The calculation more particularly comprises the summation of two terms: the first term is the orthogonality factor between the channels of the station. The second term is the product of the orthogonality factor between the channels of the station and the channels of the neighboring stations and of the sum of the ratios of the signal attenuation factors between the station and the neighboring stations.

Advantageously, the module is capable of detecting a state of overload of the station as a function of the result of the comparison.

In a first embodiment of the invention, when an overload state is detected for a set of mobiles with fixed bit rate demand, the module is capable of reducing the given set of mobiles pertaining to said station and of performing a new comparison.

In a second embodiment of the invention, for a nonoverload state detected for a set of mobiles with fixed bit rate demand, and in order to control the admission of a new mobile with fixed bit rate demand to the station, the module is capable of performing a new comparison by incorporating the new mobile and when an overload state is detected, the mobile is barred from accessing the station.

In a third embodiment of the invention, for a set of mobiles transmitting data and thus having a variable bit rate demand, the bit rate allocated to each mobile is calculated in such a way that, during the comparison, the sum is less than or equal to the threshold.

Thus, for a set of mobiles having a variable bit rate demand, the quantity representing the requirements of the mobile with regard to the station is evaluated so as to be roughly equal for each mobile of the station and so that the comparison does not detect any state of overload of the station.

In general, in an environment consisting of base stations and mobiles, the procedure and the device of the invention allow decentralized management, at the level of the stations, of congestion of the communication network and of admission of mobiles into a set of mobiles served by a base station. This decentralized management comprises decentralized control of the allocation of power by a station to a set of mobiles, decentralized control of the admission of mobiles into the set of mobiles served by a base station.

Figure 3:
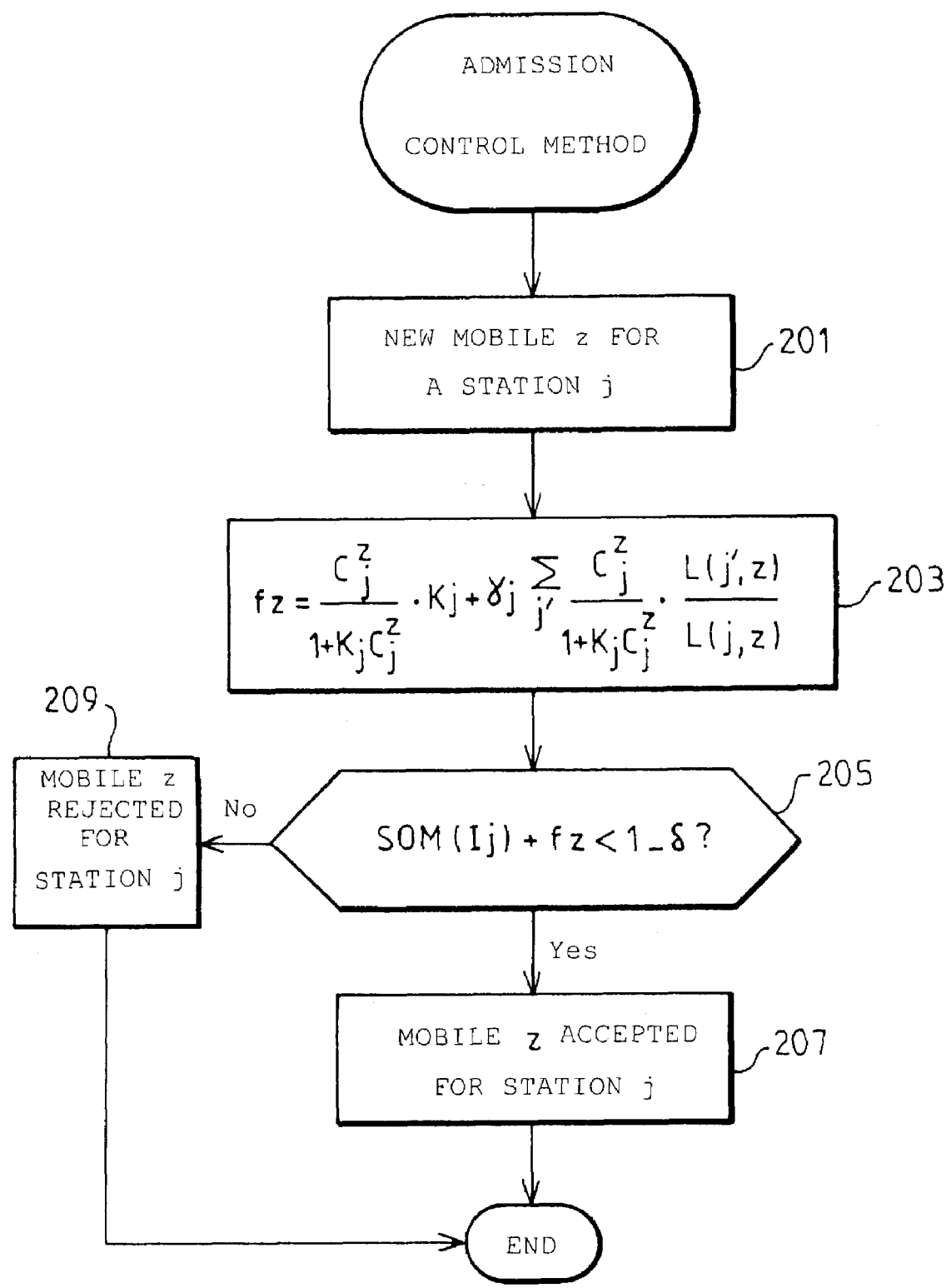
Figure 4:
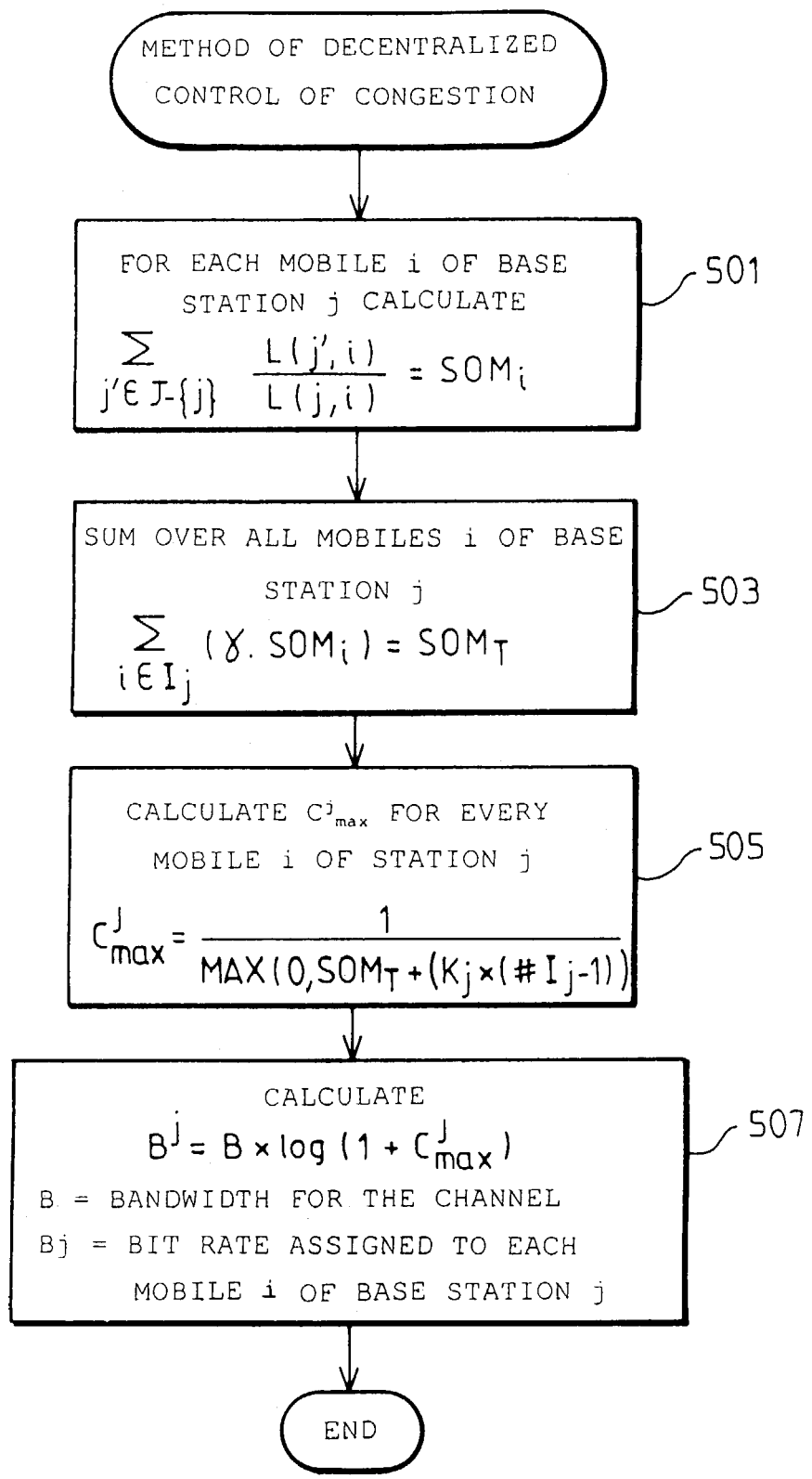

Other characteristics and advantages of the invention will become apparent on examining the detailed description hereinbelow, as well as the appended drawings in which:

FIG. 1-A illustrates a known wireless communication network,

FIG. 1-B illustrates a base station of the wireless communication network,

FIG. 2 represents a flowchart illustrating the principle of decentralized power allocation in a cell of the network according to the invention, FIG. 3 represents a flowchart illustrating a method of control of admission of a mobile to a base station according to the invention, FIG. 4 represents a flowchart illustrating a method of congestion control in a cell of the network according to the invention.

Figure 5:
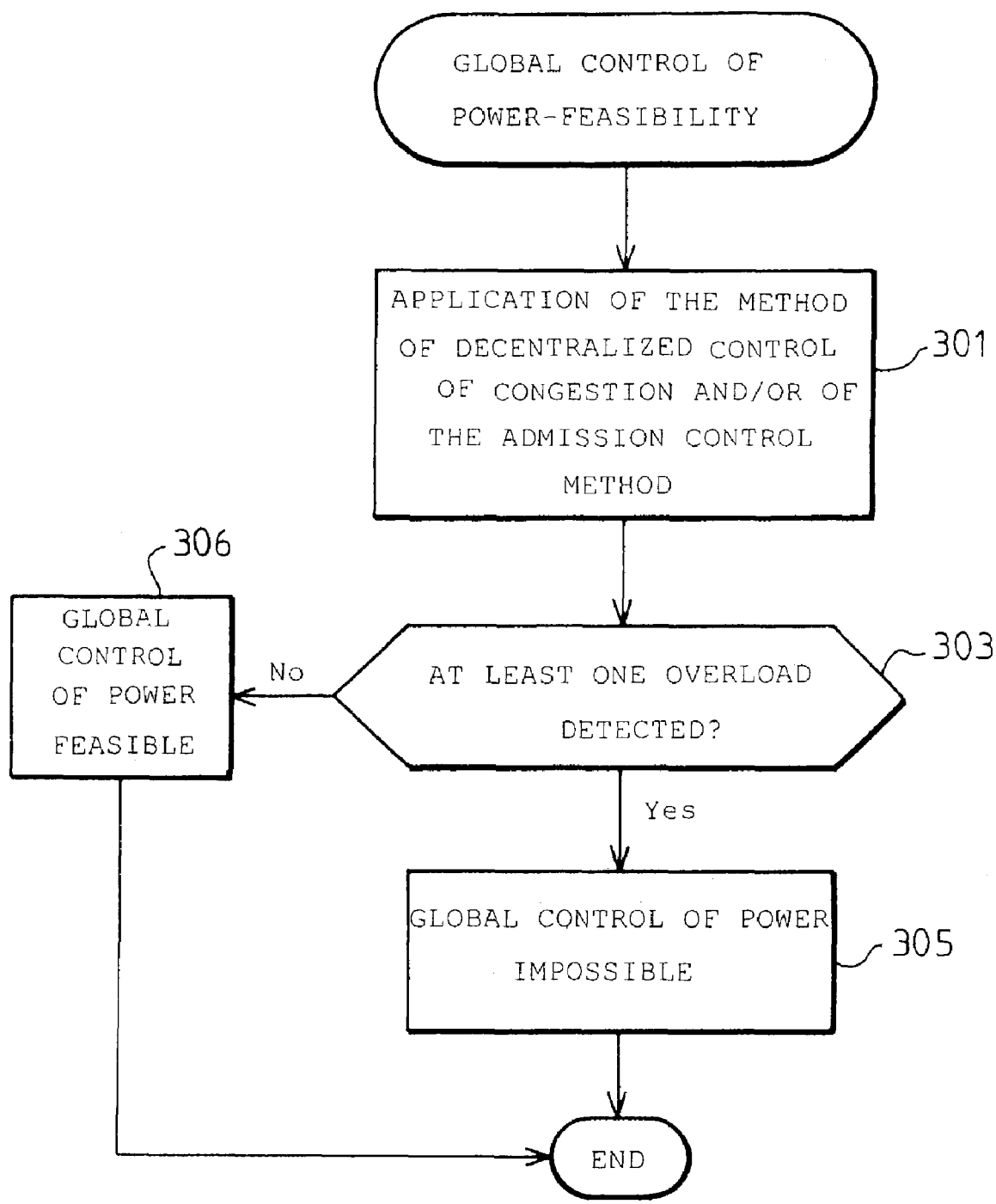
Figure 6:
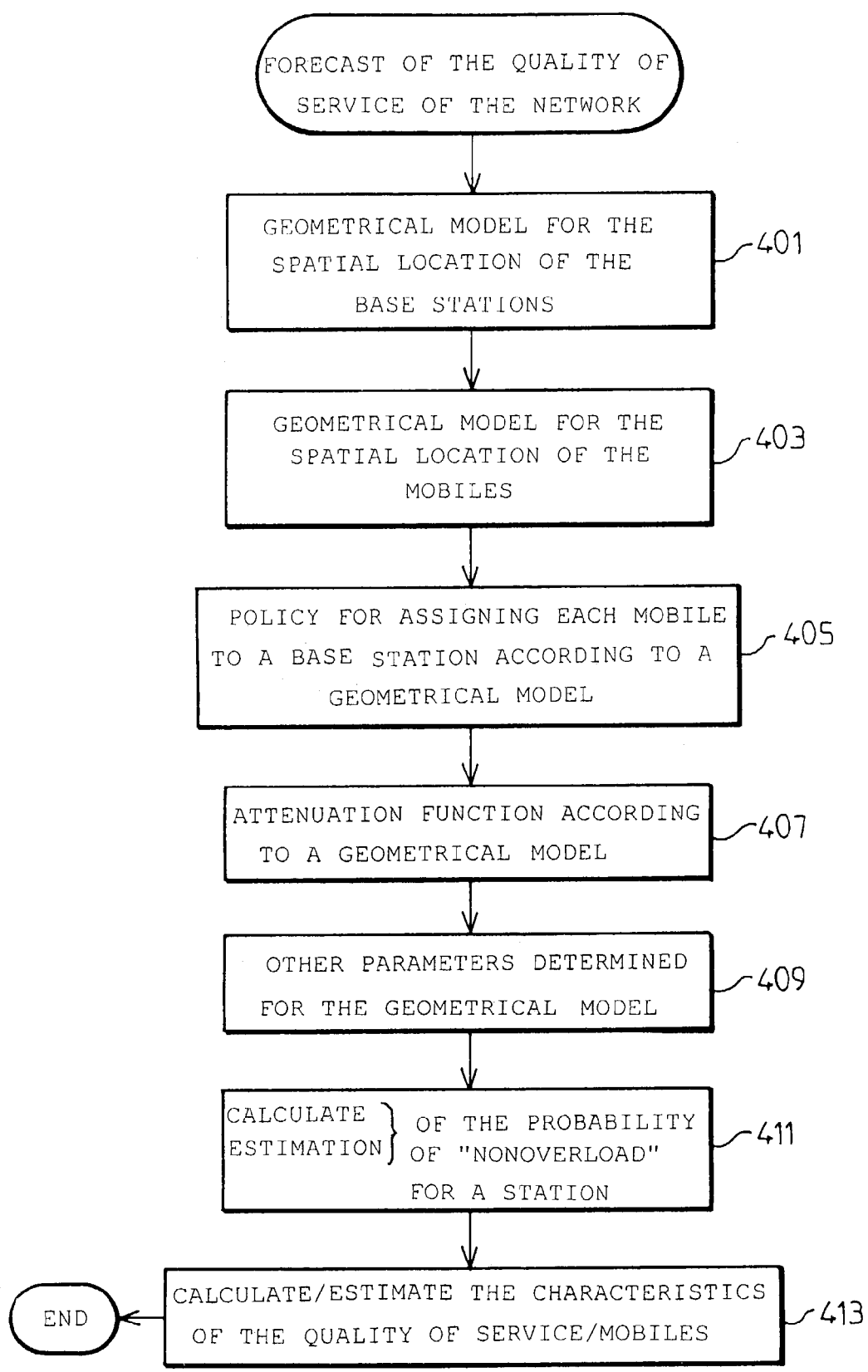
Figure 7:
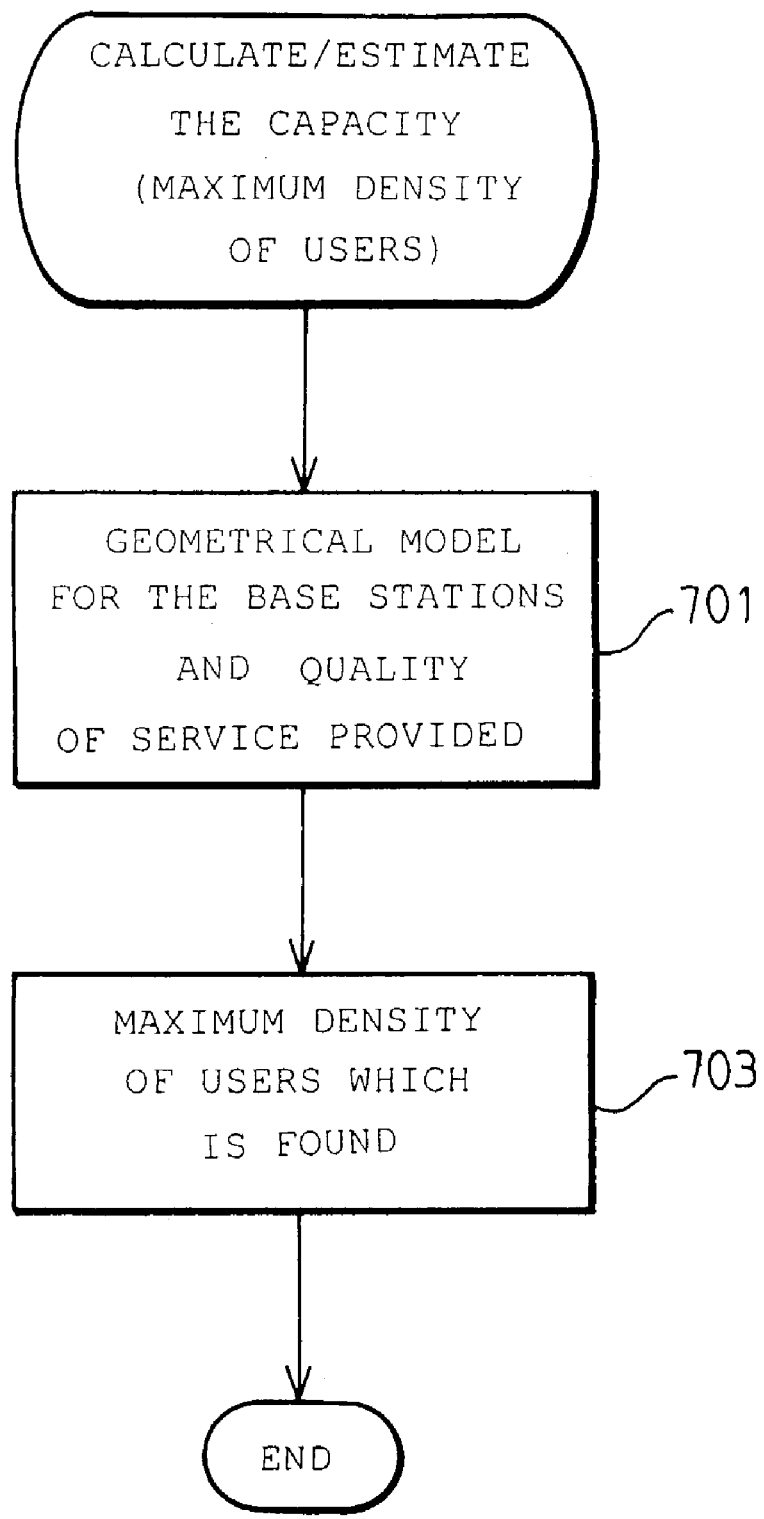
Figure 8:
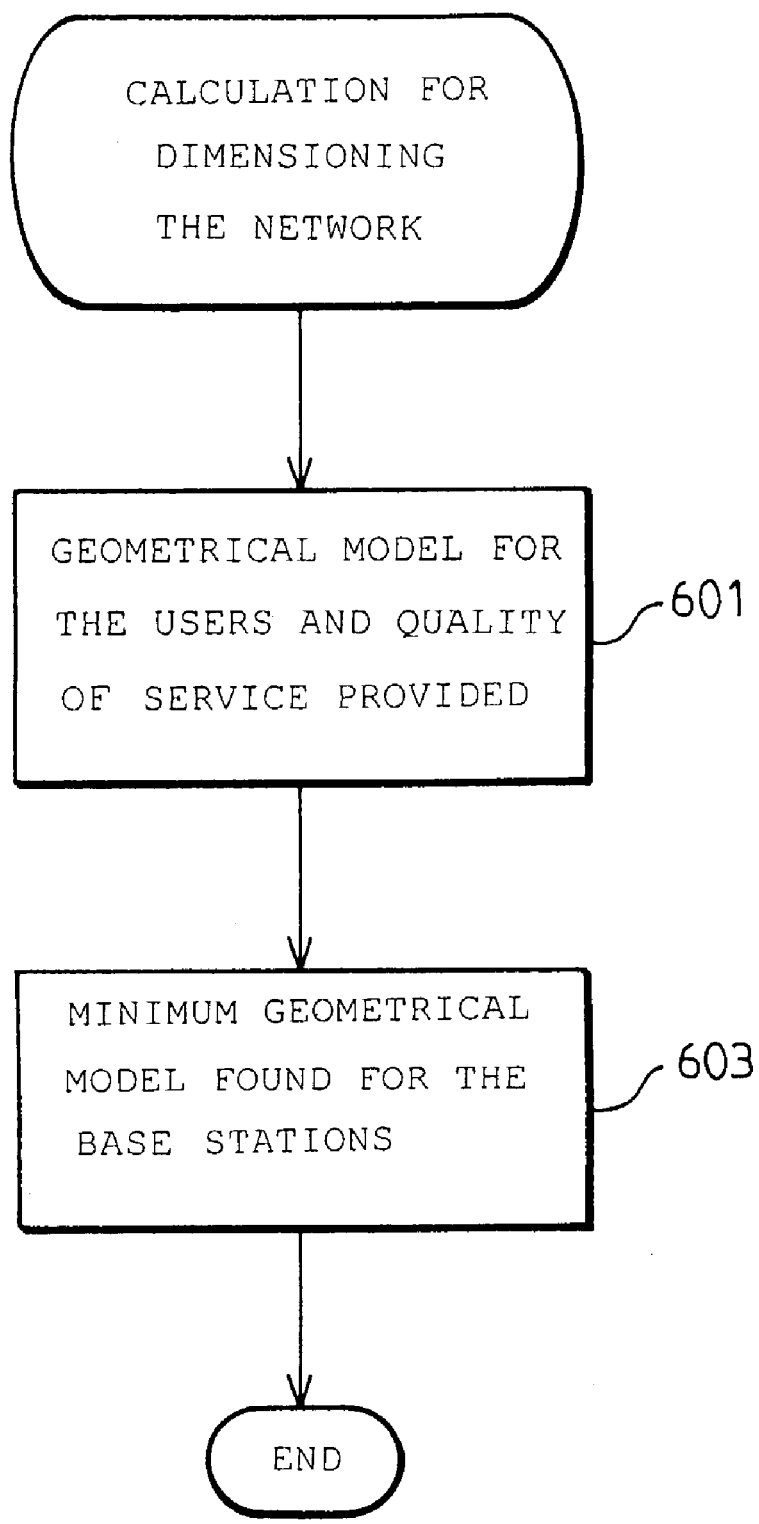
Figure 9:
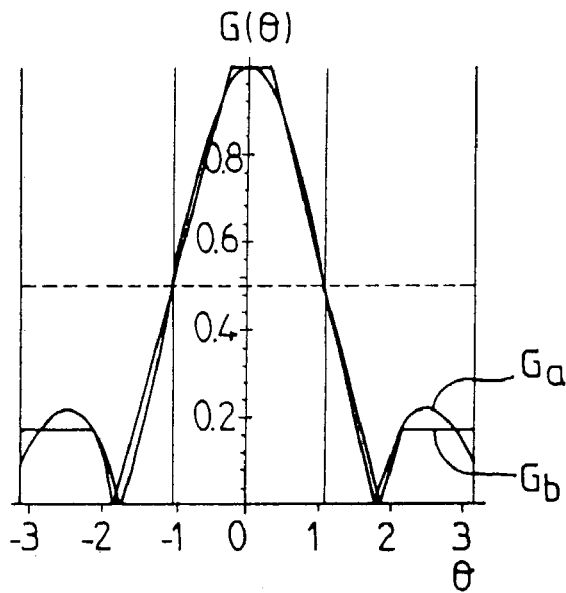
Figure 10:
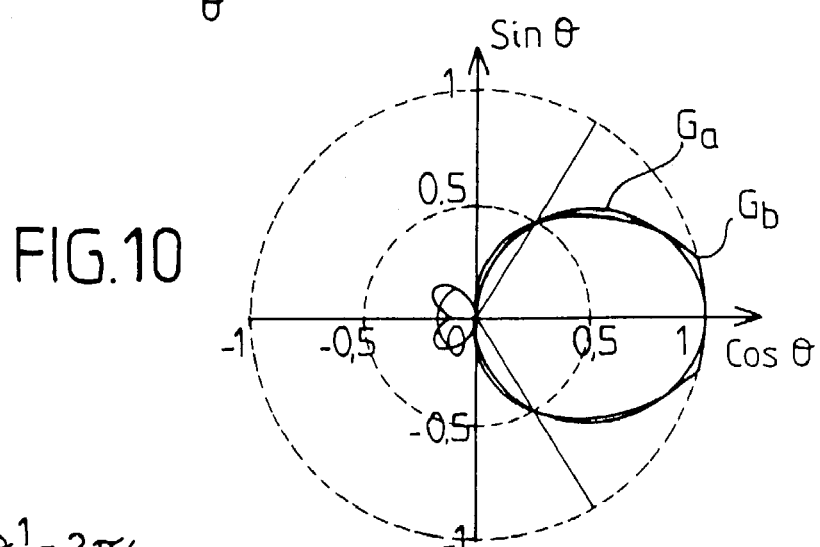
Figure 11:
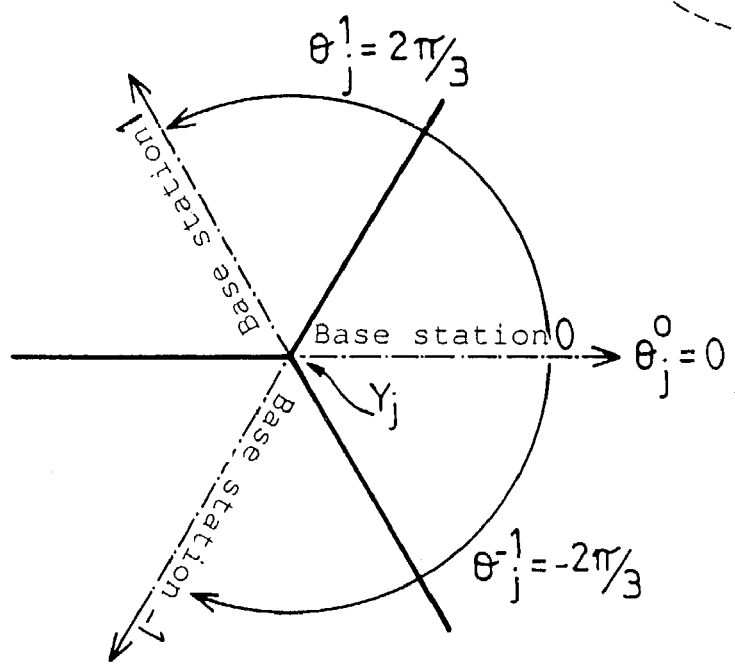

FIG. 5 represents a flowchart illustrating a method of feasibility of the control of power over the entire network according to the invention, FIG. 6 represents a flowchart illustrating a method of forecasting the quality of service of the network according to the invention, FIG. 7 represents a flowchart illustrating a method of forecasting the capacity of the network according to the invention, FIG. 8 represents a flowchart illustrating a method of calculating the dimensioning of the network according to the invention, FIG. 9 represents two examples of a function G in a Cartesian reference frame, FIG. 10 represents the same two examples of the function G in a polar reference frame, FIG. 11 represents an exemplary angular positioning of base stations situated in one and the same position $Y_j$.

Annex 1 presents the mathematical formulae used for the implementation of the invention, Annex 2 presents the different variables used and their meaning.

The drawings and the annexes contain, in essence, elements of a definite nature. They may therefore serve not only to elucidate the description, but also to contribute to the definition of the invention, as the case may be.

FIG. 1A represents a wireless communication network RC. This wireless communication network RC comprises various cells C1, C2. Each cell is composed of a base station SB establishing a communication with a plurality of mobiles. Thus, the cell C1 comprises the base station SB1 and the mobiles 10, 11, 12; the cell C2 comprises the base station SB2 and the mobiles 20, 21, 22, 23. The wireless communication networks comprise a transmission layer between the network and the clients which is controlled by a protocol, for example the CDMA (Code Division Multiplex Access) protocol. This protocol allows in particular each mobile to use the same wide frequency band. For a given mobile of a given cell, this CDMA protocol uses orthogonal or pseudo-orthogonal codes to filter the signal bound therefor by superimposing all the signals transmitted by the base stations. These signals are attenuated in such a way as to form noise in respect of the relevant mobile i such that the ratio of the signal transmitted by base station j to the noise is greater than a threshold $C_j^i$. This threshold is given by Shannon's theorem (detailed in chapter 7 of the following work: [1] Cover, T. M. and Thomas, J. A. (1991) *Elements of Information Theory*, Wiley and Sons, New York) which is dependent on the bit rate required by the mobile (source). In order to establish a communication from the base station to a mobile (communication said to be on the downlink), the power $S_j^i$ of the signal transmitted from a base station j must be sufficient to cover the noise of the communications with other mobiles and to be able to be received by the relevant mobile i.

This pertains to a problem of power allocation on the downlink. Various works treat this problem by considering different conditions. A first model consists in searching, by way of a linear equation, for the number of mobiles which can be served by a base station, these mobiles demanding the same bit rate. This model does not take into consideration the problem of competition between the base stations of the network in order to allocate a given power to mobiles. Specifically, the total power of a base station does not depend in this model on the number of mobiles served by the station.

Thus, a second model incorporates the dependence of the total power of a station with regard to the number of mobiles served by the station under certain conditions and is developed in the following works:

[2] J. Zander. Distributed co-channel interference control in cellular radio systems. IEEE Trans. Veh. Technol., 41:305-311, 1992.

[3] J. Zander. Performance of optimum transmitter power control in cellular radio systems. IEEE Trans. Veh. Technol., 41:57-62, 1992.

The problem is posed by the equation of the second model $Z.S \leq S.(1+C)/C$, the vector S representing the unknown transmitted powers, C representing the required signal-to-interference ratio, the matrix Z giving the ratio of gain to normalized attenuation between a user i and a station k. The problem has a solution if a necessary and sufficient condition is fulfilled, the ratio C having to be less than an expression dependent on the Perron-Frobenius eigenvalue of the matrix Z. The problem is simplified in particular by regarding external noise to be negligible. Hereinafter, we shall speak either of signal-to-interference ratio or of signal/noise ratio.

The following works develop the second model under certain conditions:

[4] S. V. Hanly. Capacity in a two cell spread spectrum network. *Thirtieth Annual Allerton Conf. Commun., Control and Computing*, IL: 426-435, 1992.

[5] S. V. Hanly. Capacity and power control in spread spectrum macrodiversity radio networks. *IEEE Trans. Commun.*, 44: 247-256, 1996.

[6] S. V. Hanly. Congestion measures in DS-CDMA networks. IEEE *Trans. Commun.*, 47: 426-437, 1999.

It should be noted that [4] has incorporated the noise external to the network. [6] extends the model by incorporating the noise external to the network and the noise originating from intra-cellular communications. [6] proposes to solve this problem in two steps:

study of the conditions of allocation of intra-cellular power, calculation of the power of a few aggregated cells.

The evaluation of the Perron-Frobenius eigenvalue of the matrix Z can be performed on the basis of the knowledge of the state of the network or on the basis of a test channel as suggested in [6] or in the following work:

[7] C. Zhu and M. S. Corson. A distributed channel probing for wireless networks. *Proc of IEEE Infocom* 2001, pages 403-411, 2001.

When the problem is feasible, the finite minimum solution of the second model can be evaluated in a decentralized manner, in other words for each base station of the network as described in paragraph IX of [5].

However, the treatment of this power allocation problem has not hitherto made it possible to perform, at the scale of a network, decentralized control of the population of mobiles demanding communication to a base station nor decentralized control of the bit rate of the mobiles for a communication.

The power allocation problem is represented by equation 1.1 as indicated in [6]. The ratio of the signals attenuated over a set of interferences must be greater than a given threshold. The set of interferences comprises noise external to the network (first term of the denominator of equation 1.1) received by the relevant mobile, the noise originating from intra-cellular communications (second term of the denominator of equation 1.1), the noise originating from extra-cellular communications (third term of the denominator of equation 1.1). The noise originating from intra- or extra-cellular communications is defined as a function of a pilot power P also called the power of the pilot signal which represents a signal transmitted continuously by each base station so as to allow the mobiles to determine which base station is serving them and the information useful for establishing a communication between the base station and the mobile.

This equation 1.1 can be decomposed into two systems of linear equations 1.2 and 1.3 under the constraint 1.4. Thus, the unknown S of the equation system 1.2 represents the global power of the system and comprises the set of unknowns $S_j$ each of which represents the global power of a base station j. For each power of a base station j according to equation 1.2, the equation system 1.3 is solved in such a way as to find, for each mobile i of station j, the local power $S_i^j$ under the constraint of equation 1.4. According to this equation 1.4, the global power $S_j$ of the base station j is equal to the sum of the local powers $S_j^i$ of the mobiles i linked to this station: this condition takes into account the dependence of the total power of a station with regard to the number of mobiles served by the station.

Equation 1.2 is called the problem of global power allocation, that is to say referring to the network, while equation 1.3 is called the problem of local power allocation, that is to say referring to each base station.

The equation system 1.3 is equivalent to the expanded equation 1.6 for every i of a station j. The system 1.3 admits a solution under the constraint 1.4 if the necessary and sufficient condition 1.7 is satisfied. This condition is applied to the sum of the thresholds of the signal-to-interference ratios $H^i_j$ defined in 1.5. The subsequent description is based on the fact that this condition is fulfilled for every station j of the network.

Thus, the remainder of the description will be devoted in part to the problems of global power allocation. In the system of equations 1.2, the matrix A, the vector b and the vector S have components for each station j of the wireless communication network, such as presented in equations 1.8, 1.9 and 1.10.

The matrix A and the vector b are respectively a nonnegative matrix and a nonnegative vector as developed in chapter 6 of the reference [8] Seneta, E. (1973) *Non-negative Matrices and Markov Chains* Springer-Verlag New York. Moreover, the matrix A is said to be irreducible if for each component of the matrix A, that is to say for each pair of integers j,k (k being different from j), there exists an integer $n \geq 1$ such that $a_{jk}^n > 0$. We define $$A^* = (a_{ij}^*)_{jk} = \sum_{n=0}^{\infty} A^n.$$

We also define the concept of radius of convergence R of the matrix A as indicated in 1.11, for an irreducible matrix A, corresponding to the radius of convergence of the geometrical series $$A_{jk}(x) = \sum_{n=0}^{n} a_{jk}^n \cdot x^n.$$

Assuming that the matrix A is an irreducible and nonnegative matrix, and that the vector b is a nonnegative vector:
if the radius of convergence R is greater than 1 then the solution of the problem s=As+b corresponds to the solution A*b. Equation 1.6 also has other nonnegative solutions of the form A*b+x, x being nonnegative such that Ax=x.
if R=1 and A is transitive, then the same solutions as in the previous point apply.

In order for R to be greater than 1, it is sufficient to have the matrix A sub-stochastic such that we have equation 1.11 for all the stations j with equation 1.12 for a few stations j. This latter condition is a sufficient but not necessary condition for the existence of solutions to the problem.

We define the cost function of equation 1.13 for every mobile i each station j. This cost function 1.13 comprises a first term which depends on the threshold of the signal-to-interference ratio $H_j^i$ (in other words on the characteristics $C^{ji}$ of the mobiles i in the station j and on the orthogonality factor $\kappa_j$ between the channels of the station) and on the orthogonality factor $\kappa_j$ between the channels of the station. The second term of this function 1.13 depends on the threshold of the signal-to-interference ratio (that is to say on the characteristics $C_j^i$ of the mobiles of station j and on the orthogonality factor $\kappa_j$ between the channels of the station), on the orthogonality factors $\kappa_j$ between the channels of station j, on the orthogonality factor $\gamma_j$ between the channels of the station and the set of channels of the other stations of the network, and on the ratio of the attenuations $l(Y_k, X_i^j)$ of signals from the other stations of the network with respect to the attenuation $l(Y_j, X_i^j)$ of the signal from station j in the position $Y_j$ for each mobile i, in the position $X_i^j$, of this station j.

The matrix A is sub-stochastic if equation 1.14 (equivalent to equation 1.11) is satisfied for all the base stations j of the network and if it is satisfied strictly for a few base stations j. The satisfying of one of these equations 1.14, 1.15, 1.16 for each station j is called the principle of decentralized power allocation. Thus, for each station j, equation 1.14 depends on the characteristics (for example location, number or bit rate demanded) of the mobiles of station j and not on the characteristics of the mobiles of the other stations of the network. One speaks of the decentralized power allocation problem.

FIG. 1B illustrates a base station SB comprising an admission and congestion control module 20 linked with a computer 24, a comparator 23 and a memory 21. The memory 21 is linked with the computer 24, the comparator 23 and a processor 22. This admission and congestion control module 20 comprises the implementation of the decentralized power principle of FIG. 2 and of the method presented in FIG. 3 and/or of the method presented in FIG. 4. It cooperates with the computer 24 and the comparator 23 so as to perform the steps of these control procedures developed hereinbelow as well as the hereinafter developed procedures for estimating or for calculating characteristics of a network. This module 20 is furnished with a software product adapted for performing these procedures.

The principle of decentralized power allocation is developed in FIG. 2.

Thus, in step 101, for each mobile i of a station j, the ratio of the sum of the attenuations of the signals originating from the other stations j' of the network bound for mobile i to the attenuation of the signal originating from station j bound for mobile i is calculated.

In step 103, the equation fi, called the cost function, is calculated for each mobile i. The cost function fi comprises the calculation of a quantity incorporating the attenuation with regard to the relevant station (orthogonality factor $\kappa_j$) and the attenuation with regard to the neighboring stations (orthogonality factors $\gamma_j$ and attenuation ratios) and the product of this quantity times a factor representing the requirements of the mobile with regard to its station. This factor corresponds to the signal/noise ratio threshold $H_j^i$. Step 105 indicates the summation for all the mobiles i of station j of the cost functions fi. The population of mobiles i of station j is called $I_j$. In step 107, if the sum SOM($I_j$) calculated in step 105 is less than a value 1−δ, δ being a safety factor made explicit hereinbelow, then the traffic of the signals of the station j is acceptable in step 111. Otherwise, station j exhibits excessive traffic in step 109.

In the case of a fixed number of mobiles having a variable bit rate demand, the signal/noise ratios $C_j^i$ can be calculated as a function of the bit rate demands of the mobiles. On the basis of these ratios, the decentralized power allocation principle of FIG. 2 makes it possible to estimate whether the traffic is or is not excessive. One also speaks of a state of overload of the station. Depending on the magnitude of the traffic (or of the state of overload of the station), the congestion control method of FIG. 4 may or may not be used. Quite obviously, the congestion control method of FIG. 4 can be used directly without estimating the magnitude of the traffic.

In the case of mobiles having a fixed demand for bandwidth, the decentralized power allocation principle of FIG. 2 is applied to a method of admission control, an example of which is illustrated by FIG. 3.

In accordance with FIG. 2, it is possible to evaluate whether the population of mobiles i corresponding to a station j allows the inequality 1.14 to be satisfied without a safety factor. If this is not the case, a state of overload of the station is detected, a method of admission control consists in reducing the population of mobiles $I_j$ of the relevant station j to $\bar{I}_j$ in such a way that equation 1.15 is satisfied. In an alternative, the population of mobiles $I_j$ of the relevant station j is reduced to $\bar{I}_j$ in such a way that equation 1.16 is satisfied. Specifically, equation 1.16 proposes a smaller inequality condition than equation 1.15 with the safety factor δ so as to avoid the risk that the sum of the powers allocated by a base station j to the mobiles of the station is greater than the maximum power of the base station j.

Thus, a method of decentralized control of power allocation according to the invention comprises a procedure which for a given station j makes it possible to calculate a subset of mobiles $\bar{I}_j$ contained in the set of mobiles $I_j$ (representing the mobiles demanding access to station j) such that for this subset of mobiles, the problem of power control for station j on the downlink is feasible.

One speaks of a feasible power control problem for the network in the case where there exist solutions for the unknowns $S_j^i$ which represent the power variables in equation 1.1, this being so for each station of the wireless communication network.

This exemplary method of admission control can be applied thus: after step 109 of FIG. 2 and in the case of a fixed demand for bandwidth (equivalent to a constant bit rate demand) by the mobiles of the station, the population of mobiles of the station is decreased and the decentralized power allocation principle of FIG. 2 is recommenced for station j.

If the population of station j makes it possible to arrive at step 111, the new reduced population of mobiles of station j, called $\bar{I}_j$, is correctly served by station j.

Once the acceptable state of traffic for a station is satisfied by the procedure of FIG. 2, new mobiles can request admission to station j. In this case, the exemplary method of admission control of FIG. 3 can be applied.

In step 201, a new mobile z requests admission to a station j. In step 203, the cost function fz is calculated for the new mobile z. This cost function fz is added to the sum of the cost functions of each mobile of station j, this sum corresponding to the value SOM($\bar{I}_j$) calculated in step 105 of the procedure of FIG. 2. If, in step 205, this new sum remains less than the threshold 1−δ, then the mobile z is accepted to be served by station j which still has acceptable traffic in step 207. In the converse case, in step 209, the mobile z is rejected by station j.

To be able to calculate the population of mobiles $I_j$ of a station j in such a way that this station does not have excessive traffic, several variants of methods based on the admission control method of FIG. 3 are developed hereinbelow. Other variants of methods may also be implemented.

A first implementation consists in performing steps 101 and 103 of FIG. 2 in such a way as to calculate the cost function fi for each mobile i. In step 105, the summation of the cost functions fi is performed in a certain order and stepwise, function after function, the comparison of step 107 being performed after each summation of a new function of step 105. The summation of step 105 is halted when the condition of step 107 is achieved. The mobiles for which the cost function has been summed in step 105 are contained in the population of mobiles $\bar{I}_j$ accepted by station j and the other mobiles being barred from accessing the station.

The order in which the cost functions of the mobiles are summed may for example be:
  ascending order of the values of the cost functions, called ascending order,
  a random order.

The ascending order makes it possible to obtain a maximum population of mobiles served by the station but does not offer mobiles which are distant from the station the possibility of being in communication with the latter. One speaks of poor spatial coverage. Moreover, the station will be in a state of congestion as soon as mobiles distance themselves from this station.

The random order allows mobiles which are more distant from the station to depend on the latter, the distancing of the mobiles from the station will not necessarily give rise to a state of congestion of this station. One speaks of good robustness to mobility.

A mobile which is not accepted by a station can be reallocated to another station for which the cost function fi is smaller or for which the cost function fi is the smallest among the cost functions of the various stations.

A variant implementation can also propose that each base station communicates its sum SOM($I_j$) to the set of base stations of the network in broadcast mode. Thus, step 205 can be performed in parallel for all the base stations at a given moment. For the base stations satisfying step 205, one searches for the base station for which the value of the addition of the sum SOM($I_j$) and of the cost function of step 205 is the smallest. The mobile is accepted by this station, thus minimizing the loading of the base stations of the network.

Thus, it is possible to control the admission of mobiles to a station in such a way that the problem of global power allocation complying with equation 1.2 has solutions. Thus, the mobiles of the network are allocated to one of the stations of the network in such a way that each cell of the network is in an acceptable traffic state. The invention makes it possible in particular to manage the network so as to avoid any unacceptable traffic.

In the case where the mobiles of a station request the establishment of communication without fixed bandwidth (for a data transfer for example), the traffic generated is said to be elastic traffic. Depending on the requests of the mobiles of a station and depending on the location of these mobiles, the elastic traffic may generate a state of congestion. The congestion control method developed in FIG. 4 makes it possible to avoid a traffic jam and allows the traffic to be adapted to bit rate variations.

The method is applied in parallel for each base station j of the network. All the mobiles of the station have the same allotted bit rate, and this results in the same signal-to-interference ratio $C^j$ for every mobile of the station. The method is based on the new equation 1.17 satisfying the decentralized power allocation principle. Equation 1.17 must be satisfied for every station j and strictly for a few stations j so as to avoid any state of overload of the station. In step 501, there is calculated for each mobile i of station j the value SOMi, being the ratio of the attenuations L(j',i) of signals from other stations j' of the network to the attenuation L(j,i) of the signal from station j. In step 503, the values SOMi of all the mobiles are added up and the result is multiplied by the orthogonality factor γ between the channels of the station and all the channels of the other stations of the network. As the requested bandwidth is dependent on each mobile and since the number of mobiles is assumed fixed for any station j, there is calculated the maximum signal-to-interference ratio that the station can offer to each of its mobiles i in step 505. This equation 1.18 results from equation 1.17. As a function of this maximum signal-to-interference ratio, of the bandwidth of the CDMA channel and of approximations made regarding the Gaussian channel, there is calculated the bit rate assigned to each mobile in step 507 and indicated also at 1.19.

Initially, it is considered that no admission control method is applied and that the number of mobiles can be increased if the bit rate allotted to the mobiles is reduced. On the other hand, no mobile is rejected from the station in this method.

Thus, by this method, it is possible to control in a decentralized manner, in other words for each station, the state of the traffic. This method also makes it possible to adapt the bit rate offered to each mobile. This method can be applied for example either regularly, or with each detected movement of a mobile. Specifically, with each movement of a mobile, the denominator of equation 1.19 changes. Other conditions of application of the method may be envisaged.

The safety factor δ indicated in respect of the method of FIG. 3 is also applicable in respect of this method restraining the condition of the right-hand term of equation 1.17.

It is also possible to envisage, in respect of a station j, the combining of the methods of FIG. 3 and of FIG. 4. Thus, $\alpha_j$ defined in 1.20 represents the fraction of mobiles of the station demanding a fixed bit rate and being subject to the admission control method of FIG. 3. The population of mobiles which is accepted $\tilde{I}_j^F$ from among the population $I_j^F$ requesting a fixed bit rate communication must satisfy equation 1.21. This leaves the fraction 1−$\alpha_j$ which represents the fraction of mobiles of the station requesting elastic traffic and being subject to the congestion control method of FIG. 4. The population of this fraction is $I_j^E$. The maximum signal-to-interference ratio that the station can offer to each of the mobiles of this fraction 1−$\alpha_j$ is defined in equation 1.22.

Another way of combining the methods of FIGS. 3 and 4 consists in leaving the fixed bit rate share which is not used by the population of fixed bit rate mobiles ($\tilde{I}_j^F$) to the population of mobiles requesting elastic traffic ($I_j^E$). In this case, the maximum signal-to-interference ratio that the station can offer to each is detailed in equation 1.23. This variant requires the value of the sum of the cost functions for the population of mobiles with fixed bit rate ($\tilde{I}_j^F$) to be broadcast for example regularly.

The safety factor can be integrated into the equations developed above.

The feasibility of global power control is satisfied by the method developed in FIG. 5.

Thus, in step 301, the method of decentralized control of admission and/or of congestion is applied for each station j. If at least one overload is detected for a station j in step 303, then global power control is impossible in step 305. If no overload is detected in step 303, global power control admits of solutions in step 306.

The overload of a station j comprises
  an excessive number of mobiles with fixed bit rate demand for the station and in this case equation 1.14 for example is not satisfied for the station, and/or
  a congestion state detected for station j and in this case equation 1.14 for example is not satisfied for the station after calculation of the signal/noise ratios as a function of the bit rates demanded by each mobile of the station. During the application of the congestion control method, the signal/noise ratios are calculated in such a way as to avoid this state of congestion since they satisfy equation 1.17.

In the case of modifications of the characteristics of the network, the various methods can be reapplied. So as to forecast, for example, the optimum configuration of the network (density of base stations), the optimal service quality (possibly being the quality of reception of a communication or the quality of bit rate in respect of data transfer), the maximum density of mobiles, it is important to incorporate the variations of the characteristics of the network. So as to incorporate the variations of the characteristics of the network, probability laws are used. These probability laws have the following parameters:
  the density of the base stations ($\lambda_{BS}$) which is used to represent the installation of the stations. This is an aggregated item of information which can account for an existing network or a provisional network. This density is used as a parameter for point processes whose implementations give an estimation of the network;

the density of mobiles ($\lambda_M$) which is used to represent the installation of the mobiles. This is an aggregated item of information used as parameter for a point process.

the signal/noise ratio ($C_j^i$) This is the ratio of the useful signal power to the power of the parasitic signal received. In order to be able to establish a fixed bit rate communication with a mobile i, this ratio must exceed a threshold defined by means of a probability law which models the various reception apparatuses. For a variable bit rate demand, this ratio is calculated and conditions the possible bit rate offered by the base station.

a transmission model for ascertaining the alterations of the signal which are due to propagation through the air, for example a propagation model such as the Okumura-Hata model.

a modeling of external noise. External disturbances are modeled for example as noise regarded as constant or noise regarded as originating from another network installed according to a point process.

interference between the channels of one and the same station ($\kappa_j$). This parameter models the interference between a communications channel of a station and all the other channels of this station. This is the proportion of signal emanating from all these channels and which will be considered to be noise for the first channel.

interference between the channels of different stations ($\gamma_j$). This parameter accounts for the interference between a communications channel of a station and all the channels of the other base stations. This is the proportion of signal emanating from these channels which will be regarded as noise for the first channel.

FIG. 6 presents the forecast of the service quality in a network. The service quality can also be dubbed the reception quality or bit rate quality in respect of data transfer.

In step 401, a model of spatial location of the base stations is obtained according to a point process, for example a homogeneous Poisson point process J={$Y_j$}, J describing the locations $Y_j$ of the base stations j of the network with a density of base stations $\lambda_{BS}$ which is greater than zero and less than infinity. For this process, it is assumed that, for each station j:

the pairs ({$C_j^i$, $W_j^i$}, $\kappa_j$) are independent and that, the vectors ($C_j^i$, $W_j^i$) are independent for each mobile i of station j.

In step 403, the model of spatial location of the mobiles is also effected according to a point process, for example a homogeneous Poisson point process I={$X_j$} describing the locations of all the mobiles of the network with a density of mobiles $\lambda_M$ which is greater than zero and less than infinity.

In step 405, each mobile is assigned to a base station according to a geometrical model, for example a Poisson-Voronoi point process $I_j$. $I_j$ represents the set of mobiles of I which are located in a Voronoi cell at the point $Y_j$, this cell corresponding to the cell of station j at the point $Y_j$, connected with the point process J. $I_j$ is defined in 1.25 and is valid for all the stations j. The Voronoi cell defined in 1.26 comprises the set of mobiles of the network which are closest to the relevant base station j.

Step 407 defines an attenuation function according to a geometrical model as defined in 1.24, the attenuation function being a function of the euclidian distance between the base station and a relevant mobile.

Step 409 also proposes the determination of other parameters according to the geometrical model, these parameters being the necessary signal/noise ratio, the modeling of external noise, etc. In the case of congestion control, the signal-to-interference ratios are identical for each mobile of station j.

In step 411, the probability of "nonoverload" for a station is calculated and/or estimated by analytical methods and/or simulation methods presented hereinbelow. This probability of nonoverload is also called the quality of service centered on the base station. In the case of admission control, this quality of service centered on the station corresponds to a measure of level of admission centered on the base station, the probability that station j serves all the mobiles attached to this station is presented in 1.36. In the case of congestion control, this quality of service centered on the base station corresponds to the probability that the station serves a certain bit rate to all the mobiles attached to this station. In step 413, the characteristics of the quality of service centered on the mobiles are calculated and/or estimated. The characteristics of the quality of service centered on the mobiles comprise the frequency of admissions of request for communication from a mobile to a station for the case of admission control as well as the probability that the mobile located at a certain place obtains its communication with a station. Thus, for calculated or estimated realized communication probabilities, the characteristics of the quality of service for each station j are obtained.

In the case of congestion control, the characteristics of the quality of service centered on the mobiles comprise the probability that the mobile has obtained from the station the demanded bit rate, the frequency of obtaining the demanded bit rate.

From these for example calculated or fixed characteristics of service quality, FIG. 8 proposes a dimensioning of the network.

In step 601, a required service quality and the estimated geometrical model for the mobiles ($\lambda_M$) are provided.

In step 603, the minimum geometrical model is found for the base stations ($\lambda_{BS}^\in$) such that the required service quality satisfies the required condition of inequality 1.32. Step 603 makes it possible to calculate or to estimate the minimum density of stations.

FIG. 7 proposes the calculation or the estimation of the maximum density of mobiles $\lambda_M^\in$ over the entire network.

In step 701, a geometrical model is provided for the base stations of the network as well as the required service quality (fixed or calculated) for the network as calculated by equation 1.16 for example.

In the case of admission control, in step 703, the maximum distribution of mobiles $\lambda_M^\in$ is the solution of equation 1.27 for a reduced population of mobiles. Equation 1.27 indicates that for a given base station, for example for the station j=0, there is a probability greater than 1−∈ that all the mobiles of the station are accepted. In an exemplary implementation, the maximum density of mobiles which is found for the station j=0 is the same for all the stations of the network. The function $\lambda_M^\in = \lambda_M^\in(\lambda_{BS})$ signifies that for a given base station, there is a probability ∈ that at least one mobile is rejected by this base station.

In the case of congestion control, in step 703, the maximum distribution of mobiles which is found must comply with the requirement that the probability of obtaining a signal-to-interference ratio (1.18) greater than a given value be fairly large (close to 1).

To implement the procedures deployed in

FIGS. 5 to 7, various geometrical models can be used. Thus, the Poisson-Voronoi homogeneous mean model is derived from the Poisson-Voronoi homogeneous model by considering the set of base stations to be stationary.

The consequence of this is that the random coefficients of the matrix A and of the vector b which are given by equations 1.8, 1.9 and 1.10 are equal for each column. The Poisson-Voronoi mean model consists in simplifying the problem of equation 1.2 by replacing the random coefficients by their mean. The notation E[a] represents the mean of the variable a. Thus, as equation 1.2 must satisfy equation 1.11 in order to have a solution, equation 1.28 must satisfy equation 1.29 in order to have a solution.

Methods of algebraic analysis are developed hereinbelow by way of example, based on the Poisson-Voronoi mean model.

In accordance with this model, the event corresponding to 1.14 for the station j=0 has as complement the event 1.30. The probability of the event corresponding to 1.14 for the station j=0 has as complement the probability 1.32. In the description which follows, the function 1.31 is approximated in such a way as to find the maximum density of the mobiles of station j for which 1.32 is satisfied. A hypothesis regarding the attenuation factor is made as for example in 1.33 and depends on the euclidian distance, the pilot powers being regarded as zero as an approximation in order to simplify the calculation. The means of formulae 1.8, 1.9 and 1.10 are calculated in 1.34, 1.35, 1.36 with generic random variables (C, W, T) and κ. The integrals of these formulae can be analytically evaluated for particular attenuation functions as defined in 1.37 or 1.38. In both these cases, and for certain conditions fulfilled (developed in the annex), formulae 1.33 and 1.34 are approximated by formulae 1.39 and 1.40. Thus, by approximating equation 1.29 by adding formulae 1.39 and 1.40, it is possible to calculate the capacity of the station, in other words the maximum density of mobiles which is admitted by the station.

Moreover, it is also possible to bound the probability like that of 1.31 or the probability of obtaining a signal-to-interference ratio less than a small ratio, the probability of obtaining a bit rate less than a small bit rate in respect of congestion control. Thus, Chernov's inequality formulated in 1.41 for the left-hand side of equation 1.14 and for a station j=0 enables an upper limit bound to be placed on the probability that the sum of the cost functions is greater than a limit z. By combining Jensen's inequality in 1.42 with Chernov's inequality, the upper limit is itself bounded by an explicit upper limit. Thus, the probability that the sum of the cost functions is greater than a limit z is bounded by this explicit upper limit. This latter comprises a function J(t) defined in 1.43.

According to the procedure of FIG. 6, the value of this function is calculated in such a way as to find the required service quality.

According to FIG. 7, the service quality is dependent on the density of mobiles, as indicated by equation 1.31. The base station density is known, as is a condition on the service quality, as indicated by equation 1.32, so that the maximum density of mobiles is the unknown of the function.

According to FIG. 8, the density of mobiles is known, as is a condition on the quality of service provided, so that the base station density is the unknown of the function.

Simulation methods are also possible for estimating the unknowns of the procedures of FIGS. 5 to 7. An exemplary method of simulation in the case of simulation of the admission capacity in the static state is tackled hereinbelow.

Thus, a coarse simulation can be applied by choosing the simulation of k independent models of Poisson point processes with their discrete density of respective mobiles $\lambda_0 < \lambda_1 < \ldots \lambda_k$ each density of mobiles exhibiting a deviation $\Delta i$ from the immediately lower density of mobiles. The probability of equation 1.31 can thus be calculated for each density of mobiles so as to find the interval of the densities of mobiles which makes it possible to obtain the interval of the desired probabilities. This simulation makes it possible to obtain the service quality characteristics based on the base station.

A dynamic simulation can also be performed and makes it possible to obtain the service quality characteristics based on the mobiles by incorporating their possible movement. In this case, a spatio-temporal process is simulated for the mobiles of a base station under the condition of equation 1.14. Such a simulation can be obtained by using the technique developed in the work

[9] W. S. Kendall and Thonnes. Perfect simulation in stochastic geometry. *Pattern Recognition*, 32:1569-1586, 2001.

The simulation is also applied to the case of congestion control.

The invention has an industrial application in the field of wireless telephony and relates to a procedure for aiding the management of an already installed or planned wireless telephony network.

In what has been described hitherto, each station was considered to be furnished with an omnidirectional antenna. Thus, the attenuation of the signal, in the above-described signal propagation model, has been regarded as dependent on the distance to the antenna only.

In a real network, use is made of a system of directional antennas instead of an omnidirectional antenna. In the above description, an omnidirectional antenna has an angular coverage of $2\pi$ rad (360°) and thus covers the entire zone which surrounds it. The system of directional antennas comprises at least two directional antennas each covering a sector of the zone covered by an omnidirectional antenna, this zone is called the omnidirectional zone.

Thus, it is possible to improve the capacity of the network by taking account of the presence of directional antennas and of the sectorization of the omnidirectional zone.

We introduce a function G, the so-called normalized radiation model function, which depends on the angle $\theta$ representing the azimuth of the axis of the directional antenna. By way of example, this function can be a sinusoidal function Ga as presented in 1.44 for an angle $\theta$ lying between $-\pi$ and $+\pi$, the value of the variable w advantageously being chosen so that $G(\pi/3)=\frac{1}{2}=3$ dB. This function G can also be a parametric function Gb according to the value of the angle $\theta$ with respect to angles $\theta1$ and $\theta2$ defined by way of example in 1.45 so that $G(\pi/3)=\frac{1}{2}=3$ dB. An illustration of these two exemplary representations of the function G is given in FIG. 9 in a Cartesian reference frame and 10 in a polar reference frame with for Gb, $\theta1=\pi/12$ and $\theta2=2\pi/3$.

In general, the function G applied to an omnidirectional function of a station acts as a filter and makes it possible to obtain a directional function by incorporating the main lobe and possibly the side lobes of the omnidirectional function. For example, the attenuation L(x,y), dependent on the location x of the receiver (a mobile) and on the location y of the transmitter (a station), corresponds to an omnidirectional attenuation as defined in the description hereinabove. To this omnidirectional attenuation is applied the function G as indicated in 1.46 to obtain the directional attenuation L(x, y,$\theta$) dependent on the positions of the transmitter, of the receiver and on the azimuth of the directional antenna, the function G depending on the angle between the direction of the azimuth of the antenna and the direction given by the path between the transmitter and the receiver. The more the direction given by the path between the transmitter and the receiver approaches the direction of the azimuth the smaller is the attenuation of a signal. This attenuation $L(x,y,\theta)$ reproduces the behavior of a directional antenna.

Solely by way of example, we consider three directional antennas in one and the same position y and each covering a sector of $2\pi/3$ rad (120°) in a complementary manner so as to cover the omnidirectional zone of $2\pi$ rad (360°). Thus, the azimuth of each directional antenna at a position y is represented by the variable $\theta^u$ as defined in 1.47, u being a natural integer taking a number of values which is equal to the number of antennas in the position y, for example the values −1, 0 and 1 in the case of three antennas. The same function G is used to define the directional attenuation of each antenna. The attenuation of the directional antennas in a position y can be defined by a vector $L(x,y,\theta)$ having as components the directional attenuation of each antenna in this position y and exhibiting a different azimuth as a function of the natural integer u. The total attenuation formed by the directional antennas in a position y is presented by formula 1.49 as the sum of the directional attenuations of each antenna. This total attenuation is simplified by factoring out the omnidirectional attenuation $l(x,y)$ as presented in 1.50.

The power allocation problem of equation 1.1 is tailored to a context of directional antennas in equation 1.51. A base station (j,u) is defined by its position $Y_j$ and by its directional antenna u. Several base stations (three in the example of FIG. 11 and the example developed) lie in one and the same position $Y_j$. $\theta_j^u$ defines the orientation of antenna u in position $Y_j$. Thus, the variables of equation 1.1 are redefined as a function of u defining one of the antennas in position $Y_j$ (the signal transmitted by the station (j,u) and bound for mobile i, the noise external to the network received by the relevant mobile i, the noise originating from intra-cellular communications (j,u), the noise originating from extra-cellular communications) and as a function of $\theta_j^u$ (the attenuation of the power transmitted by station (j,u) and bound for mobile i). The feasibility analysis of the power allocation and of the decentralized congestion/admission control is the same as before, adapted to the number of base stations and to the station (antenna) orientation variable.

The principle of decentralized power allocation in FIG. 2 can also be applied in respect of the case of base stations furnished with a directional antenna (j,u). Thus, the cost function of equation 1.52 is calculated in the same manner as before but starting from equation 1.51 and 1.46. This cost function is calculated for a station (j,u) furnished with a directional antenna and for a mobile placed at x. It should be pointed out that in the second and third terms of the function, the variables γ and H can be factored out of the sum of the ratios of directional attenuations for the stations neighboring the relevant station. The neighboring stations comprise the stations having the same position Yj as the station (j,u) but a different angular position and the stations having a different position Y from that of station (j,u) and any angular position whatsoever. The threshold of the signal/noise ratio H is expanded in 1.53 and represents the requirements of a mobile with regard to its station. It is dependent on the maximum signal to noise ratio C common to all the mobiles of the stations. This ratio could also be common to all the mobiles of one station only. Condition 1.14 for the feasibility of the allocation problem and used for decentralized control of congestion/admission is adapted in 1.54 for each station (j,u) comprising a directional antenna. The decentralized control of congestion/admission of FIGS. 3 and 4, the feasibility of the global control of power of FIG. 5 and the methods of FIGS. 6 to 8 are applicable in respect of base stations furnished with directional antennas by using the adapted formulae.

The forecast of the service quality developed earlier and based on the Voronoi cell is also applicable in the case of stations furnished with directional antenna in respect of a homogeneous Poisson point process. For this, a new directional Voronoi cell is defined in 1.57 and comprises the set of mobiles of the network which are closest to the relevant station (j,u) that is to say the mobiles which lie in the sector covered by the antenna u of the station (j,u). The definition in 1.55 is based on the intersection of the Voronoi cell defined in 1.26 in respect of a station with omnidirectional antenna and mobiles lying in a sector spanning from $-\pi/3$ rad to $+\pi/3$ rad around the azimuth of the relevant antenna u at the position Yj.

For a homogeneous Poisson point process, by considering the spatial density of mobiles $\lambda_M$ and, in the nonlimiting example of three antennas at the same position Yj, the spatial density of stations $3.\lambda_{BS}$ ($\lambda_{BS}$ being the spatial density for a station situated at a position Yj), condition 1.54 is calculated as the mean sum of the cost functions of a given sector for the mobiles of this sector. The given sector is defined by a position of the station at the origin $Y_0=0$ with orientation $\theta_0=0$ rad and the corresponding directional Voronoi cell is $V_0^0$. The mean number of mobiles per directional Voronoi cell is $\lambda_M/3\lambda_{BS}$. Thus, condition 1.54 as a mean can be calculated by taking each term of the cost function 1.52 separately and by evaluating the mean of the sum of each term for all the mobiles of the cell. Thus, the mean of the sum for all the mobiles of the cell of the second term of the cost function is evaluated in 1.60 as a function of G1, that of the third term of the cost function is evaluated in 1.61 as a function of G2 and L. The mean of the threshold of the signal/noise ratio E[H] depends on the bit rate demanded by a mobile, the functions G1, G2 and L are given in 1.57, 1.58, 1.59. For a given station at a given position and in a given orientation ($Y_0=0$, $\theta_0=0$) and for the mobiles of the given cell, G1 makes it possible to calculate the angular interference with the other stations of the same position ($Y_0=0$, $\theta_0=2\pi/3$ and $\theta_0=-2\pi/3$), G2 and L make it possible to calculate the interference, respectively angular and of position Y, with the other stations in different positions and any orientations whatsoever (Yj,$\theta^u$). In the condition of 1.56, the term γG1 represents the interference of directional antenna u with the other directional antennas of the same position, the term γ.G2.L represents the interference of the directional antenna u with the base stations of the other positions. By way of comparison, equation. 1.62 corresponds to the mean condition for stations exhibiting an omnidirectional antenna, a single station lying at a given position Yj.

Advantageously, the directional antenna consideration makes it possible to admit much greater traffic than by considering an omnidirectional antenna per base station. In the example of three antennas at the same position Yj and for G1=0, G2=1, the traffic admitted is three times greater per base station in comparison with an omnidirectional mode.

However, the gain is lower in the case of directional antennas since interference between base stations of the same position get added and the interference with the other base stations increases.

In general, it is possible to increase or to decrease the number of base stations at the same position $Y_j$. Moreover, each antenna has been regarded as having the same function G. In another implementation, it is possible to adapt the function G as a function of the relevant antenna for example. It is also possible to place the directional antennas having the same position $Y_j$ according to a different angular arrangement from that described in the example.

Of course, the invention is not limited to the form described hereinabove but extends to other implementational variants.

Various geometrical models may be used according to the invention. It is thus possible to use an inhomogeneous Poisson-Voronoi model and, more generally, inhomogeneous or periodic geometrical models.

Annex 1

$$\frac{S_i^j l(Y_j, X_i^j)}{W_i^j + (E_i^j)_{int} + (E_i^j)_{ext}} \geq C_i^j \tag{1.1}$$

with $(E_i^j)_{int} = \kappa_j l(Y_j, X_i^j)\left(P_j + \sum_{i' \neq i} S_{i'}^j\right)$ and $(E_i^j)_{ext} = \gamma \sum_{k \neq j} l(Y_k, X_i^j)\left(P_k + \sum_{i'} S_{i'}^k\right)$ $\kappa_j \geq 0$ and $\gamma \geq 0$ $$S \geq AS + b \tag{1.2}$$

with $S = (S_j)_{j=1}^J$

For each S found from equation (1,2), for each j:

$$\tilde{S}_j \geq \overline{A}_{jj}\tilde{S}_j + \tilde{d}_j \tag{1.3}$$

with $\tilde{S}_j = (S_i^j)_{i=1}^{I_j}$ $$S_j = \sum_i S_i^j \tag{1.4}$$

$$H_i^j = \frac{C_i^j}{1 + \kappa_j C_i^j}. \tag{1.5}$$

$$S_i^j \geq H_i^j\left(\frac{W_i^j}{l(Y_j, X_i^j)} + \kappa_j(S_j + P_j) + \gamma \sum_{k \neq j} \frac{l(Y_k, X_i^j)}{l(Y_j, X_i^j)}(P_k + S_k)\right) \tag{1.6}$$

$$\kappa_j \sum_i H_i^j < 1 \tag{1.7}$$

$$a_{jj} = \sum_i \kappa_j H_i^j \tag{1.8}$$

$$a_{jk} = \gamma \sum_i \frac{H_i^j l(Y_k, X_i^j)}{l(Y_j, X_i^j)}, k \neq j \tag{1.9}$$

$$b_j = \sum_i H_i^j\left(\frac{W_i^j}{l(Y_j, X_i^j)} + \kappa_j P_j + \gamma \sum_{k \neq j} \frac{l(Y_k, X_i^j)}{l(Y_j, X_i^j)} P_k\right) \tag{1.10}$$

for $R > 1$:

$$\sum_k a_{jk} \leq 1 \text{ for every } j, \tag{1.11}$$

and $$\sum_k a_{jk} < 1 \text{ for some } j \tag{1.12}$$

-continued $$f_i^j = \kappa_j H_i^j + \gamma \sum_{k \neq j} \frac{H_i^j l(Y_k, X_i^j)}{l(Y_j, X_i^j)}, i \in I_j \tag{1.13}$$

$$\sum_{i \in I_j} f_i^j \leq 1 \tag{1.14}$$

$$\sum_{i \in \overline{I}_j} f_i^j \leq 1 \tag{1.15}$$

$$\sum_{i \in \overline{I}_j} f_i^j \leq 1 - \delta \tag{1.16}$$

$$\frac{C^j}{1 + \kappa_j C^j} \sum_{i \in I_j}\left(\kappa_j + \gamma \sum_{k \neq j} \frac{l(Y_k, X_i^j)}{l(Y_j, X_i^j)}\right) \leq 1, \tag{1.17}$$

$$C^j = \frac{1}{\left(\kappa_j(\#I_j - 1) + \gamma \sum_{i \in I_j}\sum_{k \neq j} \frac{l(Y_k, X_i^j)}{l(Y_j, X_i^j)}\right)_+} \tag{1.18}$$

with $x_+$ is the max$(x, 0)$ $$B^j = B \log(1 + C^j), \tag{1.19}$$

$$0 < \alpha_j < 1 \tag{1.20}$$

$$\sum_{i \in I_j^F} f_i^j \leq \alpha_j \tag{1.21}$$

$$C^j = \frac{1 - \alpha_j}{\left(\kappa_j(\#I_j^E - 1) + \gamma \sum_{i \in I_j^E}\sum_{k \neq j} \frac{l(Y_k, X_i^j)}{l(Y_j, X_i^j)}\right)_+} \tag{1.22}$$

$$C^j = \frac{1 - \sum_{i \in I_j^F} f_i^j}{\left(\kappa_j(\#I_j^E - 1) + \gamma \sum_{i \in I_j^E}\sum_{k \neq j} \frac{l(Y_k, X_i^j)}{l(Y_j, X_i^j)}\right)_+}. \tag{1.23}$$

$l(y,x) = L(x-y)$ and for example $l(y,x) = L(\|x-y\|)$ (1.24)

$I_j = I \cap V_j(J)$, for every $j$, (1.25)

$V_j(J) = \{x \in \mathbb{R}^2 : |x - Y_j| \leq |x - Y_k| \text{ for every } k\}$. (1.26)

For one $\lambda_{BS} > 0$, $\epsilon > 1 > 0$ and $\lambda_M^\epsilon = \lambda_M^\epsilon(\lambda_{BS})$:

Pr(inequality (1,16) obtained for $j=0) \geq 1 - \epsilon$. (1.27)

$$S \geq \sum_k E[a_{0k}]S + E[b_0] \tag{1.28}$$

$$E\left[\kappa_0 \sum_{i \in I_0} H_i^0 + \gamma \sum_{k \neq 0}\sum_{i \in I_0} \frac{H_i^0 L(Y_k - X_i^0)}{L(0 - X_i^0)}\right] \leq 1. \tag{1.29}$$

-continued $$\varepsilon_0 = \left\{ \kappa_0 \sum_{X_i \in V_0} H_i^0 + \gamma \sum_{k \neq 0} \sum_{X_i \in V_0} \frac{H_i^0 L(Y_k - X_i)}{L(0 - X_i)} > 1 \right\} \quad (1.30)$$

$$Pr(\varepsilon_0) = Pr(\varepsilon_0)(\lambda_M) \quad (1.31)$$

$$Pr(\varepsilon_0) \leq \varepsilon \quad (1.32)$$

$$L(y,x) = L(|y-x|) \quad (1.33)$$

$$E\left[\kappa_0 \sum_i H_i^0\right] = \frac{\lambda_M}{\lambda_{BS}} E[\kappa H] \quad (1.34)$$

$$E\left[\sum_i \frac{H_i^0 W_i}{L(|X_i|)}\right] = \lambda_M 2\pi E[HW] \int_0^\infty \frac{re^{-\lambda_{BS}\pi r^2}}{L(r)} dr \quad (1.35)$$

$$E\left[\sum_{k \neq 0} \sum_i \frac{H_i^0 L(|X_i - Y_k|)}{L(|X_i|)}\right] = \lambda_M \lambda_{BS} 4\pi^2 E[H] \times \quad (1.36)$$
$$\int_0^\infty \left\{ \frac{re^{-\lambda_{BS}\pi r^2}}{L(r)} \int_r^\infty uL(u) du \right\} dr$$

for a few $M>0$, $r_0>0$ and $\alpha>2$:

$$L(r) = (M \max(r_0, r))^{-\alpha} \quad (1.37)$$

for a few $M>0$ and $\alpha>2$:

$$L(r) = (1+Mr)^{-\alpha} \quad (1.38)$$

For example for $M \approx 1000$, $r_0 \approx 1/1000$ and $\lambda_{BS}<10$ BS/km², $\lambda_M<100$ mobiles/km²:

$$(1.33) \approx E[HW] \frac{\lambda_M M^\alpha}{\lambda_{BS}} \frac{\Gamma(1+\alpha/2)}{(\lambda_{BS}\pi)^{\alpha/2}} \quad (1.39)$$

$$(1.34) \approx E[H] \frac{2\lambda_M}{\lambda_{BS}(\alpha-2)} \quad (1.40)$$

in which $\Gamma(a) = \int_0^\infty e^{-t} t^{a-1} dt$ for $L(r) = (Mr)^{-\alpha}$ $$\Pr\left(\sum_{i \in I_j} f_i^j \geq z\right) \leq \inf_{\theta>0} E\left[\exp\left\{-\theta\left(z - \left[\sum_{i \in I_j} f_i^j\right]\right)\right\}\right] \quad (1.41)$$

$$E\left[e^{\theta\left[\sum_{i \in I_0} f_i^0\right]} \Big| \#I_0 = N\right] \leq \quad (1.42)$$
$$E\left[\exp\left\{\theta N H_0\left(\kappa_0 + \gamma \sum_{k \neq 0} \frac{L(|Y_k - X_0^*|)}{L(|X_0^*|)}\right)\right\}\right]$$

Si $L(r) = (Mr)^{-\alpha}$ then:

$$\Pr\left(\left[\sum_{i \in I_0} f_i^0\right] \geq z \Big| \#I_0 = N\right) \leq \inf_{\theta>0} E\left[\frac{\lambda_{BS} E^{1/2}[\|V(0)\|^2] e^{-\theta(z-Nk)}}{1 - J(2\theta N\gamma)}\right] \quad (1.43)$$

in which $J(t) = t^{2/\alpha} \int_{t^{-1/\alpha}} t(e^{t^{-\alpha}} - 1) dt$, and $\inf_{\theta>0}$ is taken over $\theta$: $0 < J(t) < 1$ -continued $$G(\theta) = \left|\frac{\sin(\omega\theta)}{\omega\theta}\right| \quad |\theta| \leq \pi \quad (1.44)$$

in which $\omega = 1.81$ is chosen so that $G(\pi/3) = 1/2 = 3$ dB $$G(\theta) = \begin{cases} 1 & \text{for } |\theta| \leq \theta_1 \\ \left|1 - \frac{|\theta| - \theta_1}{2(\pi/3 - \theta_1)}\right| & \text{for } \theta_1 < |\theta| \leq \theta_2 \\ \left|1 - \frac{|\theta_2| - \theta_1}{2(\pi/3 - \theta_1)}\right| & \text{for } \theta_2 < |\theta| \leq \pi \end{cases} \quad (1.45)$$

in which $0 < \theta_1 < \pi/3 < \theta_2 < \pi$ and $\theta_1 + \theta_2 > \frac{2}{3}\pi$ is a parametric family of $G$ satisfying $G(\pi/3) = 1/2 = 3$ dB.

$$L(x,y,\theta) = l(|x-y|) G(\arg(x-y) - \theta) \quad (1.46)$$

$$\theta^u = \theta + u\frac{2}{3}\pi \quad (1.47)$$

with $(u = -1, 0, 1)$ et $\theta \in (-\pi/3, \pi/3)$ $$L(x, y, \theta) = (L(x, y, \theta^u))_{u=-1,0,1} \quad (1.48)$$
$$= \left(L\left(x, y, \theta - \frac{2}{3}\pi\right), L(x, 0, \theta), L\left(x, y, \theta + \frac{2}{3}\pi\right)\right)$$

$$L^\Sigma(x, y, \theta) = \sum_{u=-1}^{1} L\left(x, y, \theta + u\frac{2}{3}\pi\right) \quad (1.49)$$

$$L^\Sigma(x, y, \theta) = l(|x-y|) \sum_{u=-1}^{1} G\left(\arg(x-y) + \theta + u\frac{2}{3}\pi\right) \quad (1.50)$$

$$\frac{S_i^{j,u} L(X_i^{j,u}, Y_j, \Theta_j^u)}{W_i^{j,u} + (E_i^{j,u})_{int} + (E_i^{j,u})_{ext}} \geq C_i^{j,u} \quad (1.51)$$

with $\Theta_j^u = \Theta_j + u\frac{2}{3}\pi$ $$(E_i^{j,u})_{int} = \kappa_{j,u} L(X_i^{j,u}, Y_j, \Theta_j^u)\left(P_{j,u} + \sum_{i' \neq i} S_{i'}^{j,u}\right)$$

$$(E_i^{j,u})_{ext} = \gamma \sum_{(k,v) \neq (j,u)} L(X_i^{j,u}, Y_k, \Theta_k^v)\left(P_{k,v} + \sum_{i'} S_{i'}^{k,v}\right)$$

$$f^{j,u}(x, C) = \kappa_{j,u} H + \gamma \sum_{v \neq u} H \frac{G(\arg(x - Y_j) - \Theta_j^v)}{G(\arg(x - Y_j) - \Theta_j^u)} + \quad (1.52)$$
$$\gamma \sum_{k \neq j} \frac{Hl(|x - Y_k|)}{l(|x - Y_j|)}\left(\sum_{v=-1}^{1} \frac{G(\arg(x - Y_k) - \Theta_k^v)}{G(\arg(x - Y_j) - \Theta_j^u)}\right),$$

$$H = H(C, \kappa_{j,u}) = C/(1 + \kappa_{j,u} C) \quad (1.53)$$

$$\sum_{X_i \in N_M^{j,u}} f^{j,u}(X_i) < 1 \quad (1.54)$$

$$V_j^u = \quad (1.55)$$
$$V_j \cap \left\{x \in \mathbb{R}^2 : \Theta_j + u\frac{2}{3}\pi - \pi/3 \leq \arg(x - Y_j) \leq \Theta_j + u\frac{2}{3}\pi + \pi/3\right\}$$

$$\frac{\lambda_M}{3\lambda_{BS}} E[H](\kappa + \gamma G_1 + \gamma G_2 L) < 1 \quad (1.56)$$

-continued $$G_1 = \frac{3}{2\pi} \int_{-\pi/3}^{\pi/3} \left( \frac{G\left(\theta - \frac{2}{3}\pi\right)}{G(\theta)} + \frac{G\left(\theta + \frac{2}{3}\pi\right)}{G(\theta)} \right) d\theta \quad (1.57)$$

$$G_2 = \frac{9}{4\pi^2} \int_{-\pi/3}^{\pi/3} \frac{1}{G(\theta)} d\theta \int_{-\pi}^{\pi} G(\theta) d\theta \quad (1.58)$$

$$L == 4\pi^2 \lambda_{BS}^2 \int_0^\infty \left\{ \frac{re^{-\lambda_{BS}\pi r^2}}{l(r)} \int_r^\infty ul(u) du \right\} dr \quad (1.59)$$

$$E\left[ \sum_{X_i \in V_0^0} \sum_{v \neq 0} \frac{G\left(\arg(X_i) - u\frac{2}{3}\pi\right)}{G(\arg(X_i))} \right] = \frac{\lambda_M G_1}{3\lambda_{BS}} \quad (1.60)$$

$$E\left[ \sum_{X_i \in V_0^0} \sum_{k \neq 0} \frac{l(|X_i - Y_k|)}{l(|X_i|)} \left( \sum_{v=-1}^{1} \frac{G(\arg(X_i - Y_k) - \Theta_k^v)}{G(\arg(X_i))} \right) \right] = \frac{\lambda_M G_2 L}{3\lambda_{BS}} \quad (1.61)$$

$$\frac{\lambda_M}{\lambda_{BS}} E[H](\kappa + \gamma L) < 1 \quad (1.62)$$

2 Annex 2

$\Phi_{bs} = \{(Y_j)\}_{j \in J}$: the location of the base stations, in which $Y_j$ is the position of station j;

$\Phi_m = \{(X_i)\}_{i \in I}$: the location of the clients, in which $X_i$ is the position of client i;

I: the set of clients of the relevant telecommunication network;

I: number of mobiles in the population I;

Ij: the set of clients served by station j;

$\tilde{I}_j$: for any j a maximum subset of mobiles such that $\tilde{I}_j \subset$ Ij (station j supporting access to these mobiles);

J: the set of base stations of the relevant telecommunication network;

Jj: base station j in the set of base stations of the network;

S: matrix of signals of the network;

Sl(Y,X): the signal power in the position X originating from a signal of power S transmitted in position Y;

$S_j^i$: the signal transmitted by station j bound for client i;

l(Y,X): the attenuation of the signal along each route from position Y to position X;

$C_j^i$: the signal-to-noise (or interference) ratio required for reception by client i of the signal transmitted by station j (dependent on the desired bit rate which is given by Shannon's theorem);

$C^j$: the maximum signal-to-noise (or interference) ratio identical for all the mobiles of station j requesting a variable bit rate;

$\kappa_j$: the orthogonality factor between the channels of station j;

$\gamma_j$: the orthogonality factor between the channels of station j and all the channels of the other stations;

$\gamma$: the orthogonality factor identical for all the stations of, the network;

$W_i^j$: the noise external to the network transmitted to mobile i from station j;

δ: factor making it possible to arrange for the transmission power of the stations to be smaller than the maximum power of the station;

∈: spatial frequency for which a station rejects mobiles (0<∈<<1);

$\lambda_M$: spatial density of the mobiles in the network;

$\lambda_B$S: spatial density of the stations in the network; spatial density of the mobiles in the network;

$f_i$: cost function;

$P_j$: pilot power transmitted from station j;

$H_i^j$: threshold of the signal-to-noise ratio, dependent on $\kappa_j$;

B: bandwidth of the CDMA channel;

$B^j$: bit rate assigned for each mobile of a station j;

$\alpha_j$: fraction of the mobiles of a station j requesting a fixed bit rate;

M: constant $\theta_j^u$: azimuth of directional antenna u of the station (j,u) in position Yj as a function of the orientation $\theta_j$ of the directional antenna u=0 of the station (j,0) in position Yj;

$X_i^{j,u}$: mobile i served by station (j,u) in the position Yj and having a directional antenna u;

L(x,y, $\theta_j^u$): directional attenuation of the signal between mobile x and station y as a function of the azimuth θ of the directional antenna of the station y;

G(Θ): normalized radiation model function

The invention claimed is:

1. A tangible computer-readable medium encoded with a computer program for aiding the management of a wireless telephony network consisting of stations, wherein for a given mobile pertaining to a station, the computer program, when executed on a control module implements the steps of:
   a—calculating a first quantity incorporating the attenuation with regard to the station and the attenuation with regard to neighboring stations (103);
   b—calculating a product of the first quantity times another quantity representing the requirements of the mobile with regard to the station (103);
   c—summing the product for a given set of mobiles pertaining to said station (105);
   d—comparing the sum with a threshold (107) to obtain an overload state of the station; and
   e—storing the overload state.

2. The computer-readable medium encoded with a computer program as claimed in claim 1, wherein step a—comprises the summation of an orthogonality factor between the channels of the station and of the product of an orthogonality factor between the channels of the station and the channels of the neighboring stations and of the sum of ratios of signal attenuation factors between the station and the neighboring stations.

3. The computer-readable medium encoded with a computer program as claimed in claim 1, wherein, when an overload state is detected in step d—and for a set of mobiles with fixed bit rate demand, the given set of mobiles pertaining to said station is reduced and the procedure is recommenced.

4. The computer-readable medium encoded with a computer program as claimed in claim 1, wherein, for a nonoverload state detected in step d—for a set of mobiles with fixed bit rate demand, and in order to control the admission of a new mobile with fixed bit rate demand to the station, steps a—to d—are repeated for the new mobile and when an overload state is detected in step d—, the mobile is barred from accessing the station.

5. The computer-readable medium encoded with a computer program as claimed in claim 1, wherein, for a set of mobiles with fixed bit rate demand, step c—comprises a summation of the products stepwise, product after product, and in ascending order of the products.

6. The computer-readable medium encoded with a computer program as claimed in claim 1, wherein, for a set of mobiles with fixed bit rate demand, step c—comprises a summation of the products stepwise, product after product, and in a random order of the products.

7. The computer-readable medium encoded with a computer program as claimed in claim 5, wherein step d—is repeated after each step of step c—step d—comprising the fact that when an overload state is detected, the summation of step c—is interrupted and the mobiles, whose products have not been summed, are barred from accessing the station.

8. The computer-readable medium encoded with a computer program as claimed in claim 4, wherein step d—comprises, in respect of mobiles barred from accessing the station, d1—the reallocation of these mobiles to a station for which the product of step b—is the smallest.

9. The computer-readable medium encoded with a computer program as claimed in claim 4, wherein step d—comprises, in respect of mobiles barred from accessing the station, d1—the reallocation of these mobiles to a station for which the product of step c—is the smallest.

10. The computer-readable medium encoded with a computer program as claimed in claim 1, wherein, for a set of mobiles having a variable bit rate demand, the quantity representing the requirements of the mobile with regard to the station of step b—is evaluated so as to be roughly equal for each mobile of the station and so that the comparison of step d—does not detect any state of overload of the station.

11. The computer-readable medium encoded with a computer program as claimed in claim 10, wherein the quantity representing the requirements of the mobile with regard to the station of step b—is evaluated by evaluating a signal-to-interference ratio.

12. The computer-readable medium encoded with a computer program as claimed in claim 11, wherein the bit rate allocated to each of the mobiles having a variable bit rate demand in the station is calculated from a signal-to-interference ratio.

13. The computer-readable medium encoded with a computer program as claimed in claim 1, wherein, for a set of mobiles having a variable bit rate demand, the quantity representing the requirements of the mobile with regard to the station of step b—is evaluated so as to be roughly equal for each mobile of the station and so that the comparison of step d—does not detect any state of overload of the station and wherein the set of mobiles of the station comprises a subset of mobiles having a fixed bit rate demand and a subset of mobiles having a variable bit rate demand.

14. The computer-readable medium encoded with a computer program as claimed in claim 1, wherein steps a—to d—comprise the use of a geometrical model for parameters utilized in calculating the quantities.

15. The computer-readable medium encoded with a computer program as claimed in claim 14, wherein step d—comprises the determination of the probability of a state of nonoverload of the station.

16. The computer-readable medium encoded with a computer program as claimed in claim 14, wherein step d—comprises the determination of the maximum density of mobiles that each station of the network can accept.

17. The computer-readable medium encoded with a computer program as claimed in claim 14, wherein step d—comprises the determination of the minimum density of base stations that the network can accept.

18. The computer-readable medium encoded with a computer program as claimed in claim 14, wherein step d—comprises the determination of the probability that the mobile located at a certain place obtains its communication with a station.

19. The computer-readable medium encoded with a computer program as claimed in claim 15, wherein the determination is performed by methods of analysis or of simulation.

20. The computer-readable medium encoded with a computer program as claimed in claim 14, wherein the geometrical model is a Poisson model.

21. The computer-readable medium encoded with a computer program as claimed in claim 1, wherein each station comprises a directional antenna and wherein the quantity incorporating the attenuation with regard to the neighboring stations of step a—is dependent on factors of directional attenuation of the signal.

22. A device for aiding the management of a wireless telephony network consisting of stations (SB 1, SB2), comprising a module (20, 24, 23, 21) capable of executing a computer program encoded in a tangible computer-readable medium for a given mobile pertaining to a station, the computer program when executed, implementing the steps of:
  the calculation of a first quantity incorporating the attenuation with regard to the station and the attenuation with regard to neighboring stations;
  the product of the first quantity times another quantity representing the requirements of the mobile with regard to the station;
  the summation (SOM(Ij)) of the product for a given set of mobiles (Ij) pertaining to said station;
  the comparison of the sum with a threshold (1-d) to obtain an overload state of the station; and
  the storing of the overload state.

23. The device as claimed in claim 22, wherein the calculation comprises the summation of an orthogonality factor ($\kappa_j$) between the channels of the station and of the product of an orthogonality factor ($\gamma_j$) between the channels of the station and the channels of the neighboring stations and of the sum (SOMi) of ratios of signal attenuation factors between the station and the neighboring stations.

24. The device as claimed in claim 22, wherein, when an overload state is detected for a set of mobiles with fixed bit rate demand, the module is capable of reducing the given set of mobiles pertaining to said station and of performing a new comparison.

25. The device as claimed in claim 22, wherein, for a nonoverload state detected for a set of mobiles with fixed bit rate demand, and in order to control the admission of a new mobile with fixed bit rate demand to the station, the module is capable of performing a new comparison by incorporating the new mobile and when an overload state is detected, the mobile is barred from accessing the station.

26. The device as claimed in claim 22, wherein, for a set of mobiles with fixed bit rate demand, the summation comprises a summation of the products stepwise, product after product, and in ascending order of the products.

27. The device as claimed in claim 22, wherein, for a set of mobiles with fixed bit rate demand, the summation comprises a summation of the products stepwise, product after product, and in a random order of the products.

28. The device as claimed in claim 26, wherein the comparison is repeated after each summation of a product, the comparison comprising the fact that when an overload state is detected, the summation is interrupted and the mobiles, whose products have not been summed, are barred from accessing the station.

29. The device as claimed in claim 25, wherein the module is capable of reallocating to a given station the mobiles which are barred from accessing the station, the given station being a station for which the product is smallest.

30. The device as claimed in claim 25, wherein the module is capable of reallocating to a given station the mobiles which are barred from accessing the station, the given station being a station for which the summation of the products for a given set of mobiles pertaining to said station is smallest.

31. The device as claimed in claim 22, wherein, for a set of mobiles having a variable bit rate demand, the quantity representing the requirements of the mobile with regard to the station is evaluated so as to be roughly equal for each mobile of the station and so that the comparison does not detect any state of overload of the station.

32. The device as claimed in claim 31, wherein the quantity representing the requirements of the mobile with regard to the station is evaluated by evaluating a signal-to-interference ratio.

33. The device as claimed in claim 32, wherein the bit rate allocated to each of the mobiles having a variable bit rate demand in the station is calculated from a signal-to-interference ratio.

34. The device as claimed in claim 22 wherein, the quantity representing the requirements of the mobile with regard to the station is evaluated by evaluating a signal-to-interference ratio and wherein the set of mobiles of the station comprises a subset of mobiles having a fixed bit rate demand and a subset of mobiles having a variable bit rate demand.

35. The device as claimed in claim 22, wherein the module is capable of using a geometrical model for parameters utilized in calculating the quantities.

36. The device as claimed in claim 35, wherein the module is capable of determining the probability of a state of nonoverload of the station.

37. The device as claimed in claim 35, wherein the module is capable of determining the maximum density of mobiles that each station of the network can accept.

38. The device as claimed in claim 35, wherein the module is capable of determining the minimum density of base stations that the network can accept.

39. The device as claimed in claim 36, wherein the module is capable of determining the probability that the mobile located at a certain place obtains its communication with a station.

40. The device as claimed in claim 36, wherein the determination is performed by methods of analysis or of simulation.

41. The device as claimed in claim 35, wherein the geometrical model is a Poisson model.

42. The device as claimed in claim 22, wherein each station comprises a directional antenna and wherein the quantity incorporating the attenuation with regard to the neighboring stations is dependent on factors of directional attenuation of the signal.

43. The computer-readable medium encoded with a computer program as claimed in claim 1, when executed on a control module further implements the steps of:

f receiving a request from a mobile for access to the station; and g determining, based on the stored overload state, whether or not to allow the mobile to have access to the station.

44. The device as claimed in claim 22, further implementing the steps of:

the receipt of a request from a mobile for access to the station; and the determination, based on the stored overload state, whether or not to allow the mobile to have access to the station.

* * * * *